United States Patent
Higaki et al.

(10) Patent No.: US 7,249,234 B2
(45) Date of Patent: Jul. 24, 2007

(54) STORAGE SYSTEM AND STORAGE CONTROL DEVICE

(75) Inventors: Seiichi Higaki, Odawara (JP); Akinobu Shimada, Chigasaki (JP); Yoshinori Okami, Odawara (JP); Toshio Nakano, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/410,210

(22) Filed: Apr. 25, 2006

(65) Prior Publication Data

US 2006/0195669 A1   Aug. 31, 2006

Related U.S. Application Data

(63) Continuation of application No. 10/768,439, filed on Feb. 2, 2004, now Pat. No. 7,111,138.

(30) Foreign Application Priority Data

Sep. 16, 2003   (JP) ............................. 2003-323120

(51) Int. Cl.
*G06F 12/00* (2006.01)
(52) U.S. Cl. ...................... 711/162; 707/204
(58) Field of Classification Search ................. 711/162
See application file for complete search history.

(56) References Cited

U.S. PATENT DOCUMENTS

| | | | |
|---|---|---|---|
| 3,771,137 A | 11/1973 | Barner et al. | |
| 4,025,904 A | 5/1977 | Adney et al. | |
| 4,710,868 A | 12/1987 | Cocke et al. | |
| 4,993,030 A | 2/1991 | Krakauer et al. | |
| 5,155,845 A | 10/1992 | Beal et al. | |
| 5,408,465 A | 4/1995 | Gusella et al. | |
| 5,409,465 A | 4/1995 | Boggs et al. | |
| 5,459,957 A | 10/1995 | Winer | |

(Continued)

FOREIGN PATENT DOCUMENTS

EP   0 670 551 A1   2/1995

(Continued)

OTHER PUBLICATIONS

Shebly Seyrafi et al., "HDS—Menacing EMC's Business Model", A.G. Edwards, Enterprise Storage Update, Dec. 3, 2001, Issue 8, pp. 1-22.

(Continued)

*Primary Examiner*—Brian R. Pough
*Assistant Examiner*—Hashem Farrokh
(74) *Attorney, Agent, or Firm*—Reed Smith LLP; Stanley P. Fisher, Esq.; Juan Carlos A. Marquez, Esq.

(57) ABSTRACT

A first storage control device is provided with a virtual LU for showing a logical volume possessed by a second storage control device as if it were its own volume. When data processing requested from a host device is, for example, a specific processing of large load (such as direct backup, logical volume copy, and so on), whether or not the requested processing can be executed by the second storage control device is judged. When it is executable, a command is transmitted to the second storage control device to make it take over the processing.

43 Claims, 22 Drawing Sheets

U.S. PATENT DOCUMENTS

| | | | |
|---|---|---|---|
| 5,504,982 A | 4/1996 | Sharp | |
| 5,548,712 A | 8/1996 | Larson et al. | |
| 5,680,590 A | 10/1997 | Parti | |
| 5,680,640 A | 10/1997 | Ofek et al. | |
| 5,720,028 A | 2/1998 | Matsumoto et al. | |
| 5,758,118 A | 5/1998 | Choy et al. | |
| 5,809,285 A | 9/1998 | Hilland | |
| 5,835,954 A | 11/1998 | Duyanovich et al. | |
| 5,870,537 A | 2/1999 | Kern et al. | |
| 5,895,495 A | 4/1999 | Arimilli et al. | |
| 5,896,548 A | 4/1999 | Ofek | |
| 5,917,723 A | 6/1999 | Binford | |
| 5,951,694 A | 9/1999 | Choquier et al. | |
| 5,956,750 A | 9/1999 | Yamamoto et al. | |
| 5,978,890 A | 11/1999 | Ozawa et al. | |
| 6,012,123 A | 1/2000 | Pecone et al. | |
| 6,044,444 A | 3/2000 | Ofek | |
| 6,098,129 A | 8/2000 | Fukuzawa et al. | |
| 6,101,497 A | 8/2000 | Ofek | |
| 6,108,684 A | 8/2000 | DeKoning et al. | |
| 6,108,748 A | 8/2000 | Ofek et al. | |
| 6,173,374 B1 | 1/2001 | Heil et al. | |
| 6,195,730 B1 | 2/2001 | West | |
| 6,199,146 B1 | 3/2001 | Pence | |
| 6,209,002 B1 | 3/2001 | Gagne et al. | |
| 6,216,202 B1 * | 4/2001 | D'Errico | 711/112 |
| 6,219,753 B1 | 4/2001 | Richardson | |
| 6,230,239 B1 | 5/2001 | Sakaki et al. | |
| 6,240,486 B1 | 5/2001 | Ofek et al. | |
| 6,240,494 B1 | 5/2001 | Nagasawa et al. | |
| 6,247,099 B1 | 6/2001 | Skazinski et al. | |
| 6,247,103 B1 | 6/2001 | Kern et al. | |
| RE37,305 E | 7/2001 | Chang et al. | |
| 6,341,329 B1 | 1/2002 | LeCrone et al. | |
| 6,353,878 B1 | 3/2002 | Dunham | |
| 6,356,977 B2 | 3/2002 | Ofek et al. | |
| 6,363,462 B1 | 3/2002 | Bergsten | |
| 6,366,987 B1 | 4/2002 | Tzelnic et al. | |
| 6,389,432 B1 | 5/2002 | Pothapragada et al. | |
| 6,446,141 B1 | 9/2002 | Nolan et al. | |
| 6,446,161 B1 | 9/2002 | Yamamoto et al. | |
| 6,446,175 B1 | 9/2002 | West et al. | |
| 6,453,354 B1 | 9/2002 | Jiang et al. | |
| 6,457,109 B1 | 9/2002 | Milillo et al. | |
| 6,457,139 B1 | 9/2002 | D'Errico et al. | |
| 6,480,934 B1 | 11/2002 | Hino et al. | |
| 6,484,173 B1 | 11/2002 | O'Hare et al. | |
| 6,490,659 B1 | 12/2002 | McKean et al. | |
| 6,502,205 B1 | 12/2002 | Yanai et al. | |
| 6,523,096 B2 | 2/2003 | Sanada et al. | |
| 6,529,976 B1 | 3/2003 | Fukuzawa et al. | |
| 6,553,408 B1 | 4/2003 | Merrell et al. | |
| 6,560,673 B2 | 5/2003 | Elliott | |
| 6,587,935 B2 | 7/2003 | Ofek | |
| 6,598,134 B2 | 7/2003 | Ofek et al. | |
| 6,601,101 B1 | 7/2003 | Lee et al. | |
| 6,622,220 B2 | 9/2003 | Yoshida et al. | |
| 6,640,278 B1 | 10/2003 | Nolan et al. | |
| 6,640,291 B2 | 10/2003 | Fujibayashi et al. | |
| 6,647,387 B1 | 11/2003 | McKean et al. | |
| 6,647,414 B1 | 11/2003 | Eriksson et al. | |
| 6,647,476 B2 | 11/2003 | Nagasawa et al. | |
| 6,654,830 B1 | 11/2003 | Taylor et al. | |
| 6,654,831 B1 | 11/2003 | Otterness et al. | |
| 6,675,258 B1 | 1/2004 | Bramhall et al. | |
| 6,675,268 B1 | 1/2004 | DeKoning et al. | |
| 6,676,260 B2 | 1/2004 | Cobb et al. | |
| 6,681,303 B1 | 1/2004 | Watanabe et al. | |
| 6,681,339 B2 | 1/2004 | McKean et al. | |
| 6,697,367 B1 | 2/2004 | Halstead et al. | |
| 6,708,232 B2 | 3/2004 | Obara | |
| 6,711,571 B2 | 3/2004 | Putzolu | |
| 6,718,404 B2 | 4/2004 | Reuter et al. | |
| 6,745,281 B1 | 6/2004 | Saegusa | |
| 6,772,315 B1 | 8/2004 | Perego | |
| 6,779,093 B1 | 8/2004 | Gupta | |
| 6,823,336 B1 | 11/2004 | Srinivasan et al. | |
| 6,826,778 B2 | 11/2004 | Bopardikar et al. | |
| 6,851,020 B2 | 2/2005 | Matsumoto et al. | |
| 6,857,057 B2 | 2/2005 | Nelson et al. | |
| 6,871,295 B2 | 3/2005 | Ulrich et al. | |
| 6,876,656 B2 | 4/2005 | Brewer et al. | |
| 6,883,064 B2 | 4/2005 | Yoshida et al. | |
| 6,907,494 B2 * | 6/2005 | Arimilli et al. | 711/5 |
| 6,912,588 B1 | 6/2005 | Jardin et al. | |
| 6,915,379 B2 | 7/2005 | Honda et al. | |
| 6,922,761 B2 | 7/2005 | O'Connell et al. | |
| 6,973,549 B1 | 12/2005 | Testardi | |
| 6,976,103 B1 | 12/2005 | Watanabe et al. | |
| 6,993,635 B1 * | 1/2006 | Gazit et al. | 711/162 |
| 2001/0001870 A1 | 5/2001 | Ofek et al. | |
| 2001/0050915 A1 | 12/2001 | O'Hare et al. | |
| 2001/0052018 A1 | 12/2001 | Yokokura | |
| 2001/0054133 A1 | 12/2001 | Murotani et al. | |
| 2002/0004857 A1 | 1/2002 | Arakawa et al. | |
| 2002/0004890 A1 | 1/2002 | Ofek et al. | |
| 2002/0019908 A1 | 2/2002 | Reuter et al. | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0087544 A1 | 7/2002 | Selkirk et al. | |
| 2002/0087751 A1 | 7/2002 | Chong, Jr. | |
| 2002/0091898 A1 | 7/2002 | Matsunami et al. | |
| 2002/0103889 A1 | 8/2002 | Markson et al. | |
| 2002/0103980 A1 | 8/2002 | Crockett et al. | |
| 2002/0112113 A1 | 8/2002 | Karpoff et al. | |
| 2002/0124108 A1 | 9/2002 | Terrell et al. | |
| 2002/0133735 A1 | 9/2002 | McKean et al. | |
| 2002/0156887 A1 | 10/2002 | Hashimoto | |
| 2002/0156984 A1 | 10/2002 | Padovano | |
| 2002/0156987 A1 | 10/2002 | Gajjar et al. | |
| 2002/0178328 A1 | 11/2002 | Honda et al. | |
| 2002/0178335 A1 | 11/2002 | Selkirk et al. | |
| 2002/0188592 A1 | 12/2002 | Leonhardt et al. | |
| 2002/0194428 A1 | 12/2002 | Green | |
| 2002/0194523 A1 | 12/2002 | Ulrich et al. | |
| 2003/0037071 A1 | 2/2003 | Harris et al. | |
| 2003/0037127 A1 * | 2/2003 | Shah et al. | 709/220 |
| 2003/0051109 A1 | 3/2003 | Cochran | |
| 2003/0056038 A1 | 3/2003 | Cochran | |
| 2003/0061220 A1 * | 3/2003 | Ibrahim et al. | 707/10 |
| 2003/0097607 A1 | 5/2003 | Bessire | |
| 2003/0101228 A1 | 5/2003 | Busser et al. | |
| 2003/0105931 A1 | 6/2003 | Weber et al. | |
| 2003/0115218 A1 | 6/2003 | Bobbitt et al. | |
| 2003/0115432 A1 | 6/2003 | Biessener et al. | |
| 2003/0126327 A1 | 7/2003 | Pesola et al. | |
| 2003/0145168 A1 | 7/2003 | LeCrone et al. | |
| 2003/0145169 A1 | 7/2003 | Nagasawa et al. | |
| 2003/0158999 A1 | 8/2003 | Hauck et al. | |
| 2003/0163553 A1 | 8/2003 | Kitamura et al. | |
| 2003/0167419 A1 | 9/2003 | Yanai et al. | |
| 2003/0182525 A1 | 9/2003 | O'Connell et al. | |
| 2003/0187847 A1 | 10/2003 | Lubbers et al. | |
| 2003/0189936 A1 | 10/2003 | Terrell et al. | |
| 2003/0200387 A1 | 10/2003 | Urabe et al. | |
| 2003/0204597 A1 | 10/2003 | Arakawa et al. | |
| 2003/0204700 A1 | 10/2003 | Biessener et al. | |
| 2003/0212854 A1 | 11/2003 | Kitamura et al. | |
| 2003/0212860 A1 | 11/2003 | Jiang et al. | |
| 2003/0217119 A1 | 11/2003 | Raman et al. | |

| | | | | | | |
|---|---|---|---|---|---|---|
| 2003/0221077 | A1 | 11/2003 | Ohno et al. | JP | 11-065980 | 8/1997 |
| 2003/0229645 | A1 | 12/2003 | Mogi et al. | JP | 2000-276406 | 3/1999 |
| 2003/0229764 | A1 | 12/2003 | Ohno et al. | JP | 2001-067187 | 8/1999 |
| 2004/0003022 | A1 | 1/2004 | Garrison et al. | JP | 2001-195201 | 1/2000 |
| 2004/0028043 | A1 | 2/2004 | Maveli et al. | JP | 2001-249853 | 3/2000 |
| 2004/0049553 | A1 | 3/2004 | Iwamura et al. | JP | 2001-331355 | 5/2000 |
| 2004/0054850 | A1 | 3/2004 | Fisk | JP | 2002-157091 | 11/2000 |
| 2004/0054866 | A1 | 3/2004 | Blumenau et al. | JP | 2002-230246 | 2/2001 |
| 2004/0064610 | A1 | 4/2004 | Fukuzawa et al. | JP | 2004-151761 | 10/2002 |
| 2004/0064641 | A1 | 4/2004 | Kodama | WO | WO 97/09676 | 8/1996 |
| 2004/0068637 | A1 | 4/2004 | Nelson et al. | WO | WO 03/023640 A2 | 9/2002 |
| 2004/0073831 | A1 | 4/2004 | Yanai et al. | | | |
| 2004/0098547 | A1 | 5/2004 | Ofek et al. | | | |
| 2004/0103261 | A1 | 5/2004 | Honda et al. | | | |
| 2004/0111485 | A1 | 6/2004 | Mimatsu et al. | | | |
| 2004/0123180 | A1 | 6/2004 | Soejima et al. | | | |
| 2004/0139124 | A1 | 7/2004 | Kawamura et al. | | | |
| 2004/0143832 | A1 | 7/2004 | Yamamoto et al. | | | |
| 2004/0148443 | A1 | 7/2004 | Achiwa | | | |
| 2004/0158652 | A1 | 8/2004 | Obara | | | |
| 2004/0158673 | A1 | 8/2004 | Matsunami et al. | | | |
| 2004/0172510 | A1 | 9/2004 | Nagashima et al. | | | |
| 2004/0193795 | A1 | 9/2004 | Takeda et al. | | | |
| 2004/0230980 | A1 | 11/2004 | Koyama et al. | | | |
| 2004/0260875 | A1 | 12/2004 | Murotani et al. | | | |
| 2004/0260966 | A1 | 12/2004 | Kaiya et al. | | | |
| 2005/0010734 | A1 | 1/2005 | Soejima et al. | | | |
| 2005/0010743 | A1 | 1/2005 | Tremblay et al. | | | |
| 2005/0033878 | A1 | 2/2005 | Pangal et al. | | | |
| 2005/0055501 | A1 | 3/2005 | Guha et al. | | | |
| 2005/0081009 | A1 | 4/2005 | Williams et al. | | | |
| 2005/0138184 | A1 | 6/2005 | Amir | | | |

FOREIGN PATENT DOCUMENTS

| | | |
|---|---|---|
| EP | 0 881 560 A2 | 5/1998 |
| EP | 0 981 091 A2 | 8/1999 |
| JP | 09-288547 | 4/1996 |
| JP | 2000-293317 | 4/1996 |
| JP | 10-508967 | 8/1996 |
| JP | 10-283272 | 4/1997 |

OTHER PUBLICATIONS

Robert M. Montague et al., "Virtualizing the SAN", Jul. 5, 2000, Morgan Keegan, Equity Research, DataCore Software, StoreAge Networking Technologies, pp. 1-20.

Office Action from Chinese Patent Office dated Feb. 24, 2006,6 pages, and English translation of Office Action pp. 1-4.

"Celerra Data Migration Service (CDMS)", White Paper, EMC Corporation, pp. 1-3, Jan. 2002.

"SANRAD Application Note Data Migration Solution Transferring Data Between Storage Systems over Fibre-channel or SCSI Connections APP-003-03", SANRAD, 2003, Total pp. 10.

"Network Attached Storage In the Data Protection Environment", White Paper, Sony Electronics Inc., Feb. 2002, Total pp. 23.

Anderson, et al, "Hippodrome: running circles around storage administration", Storage and Content Distribution Department Hewlett-Packard Laboratories, Total pp. 15.

Sarkar, et al, "Internet Protocol storage area networks", IBS Systems Journal, vol. 42, No. 2, 2000.

Sicola, "SCSI-3 Fault Tolerant Controller Configurations utilizing SCC & New Event Codes", High Availability Study Group, Document No. X3T10 95-312r3, Rev. 3.0, Feb. 28, 1996, pp. 1-14.

Seyrafi, et al "HDS-Menacing EMC's Business Model", Enterprise Storage Update, Issue 8-Theme: Continued Momentum of Hitachi Data Systems; Updated RAID Market Details, Dec. 3, 2001, Total pp. 22.

Meggyesi, "Fibre Channel Overview", Research Institute for Particle and Nuclear Physics, Total pp. 10.

* cited by examiner

FIG.9

(a) EXAMPLE OF MAPPING TABLE
(IN THE CASE OF FIBER CHANNEL SWITCH)

| Vol ID | BLK ADDR | DEVICE ID | Port ID | Vol ID | BLK ADDR |
|--------|----------|-----------|---------|--------|----------|
| α | Ba | SD2 | TP2 | α2 | Ba2 |
| ⋮ | ⋮ | ⋮ | ⋮ | ⋮ | ⋮ |
| α | Bd | SD2 | TP2 | α2 | Bd2 |

(b) EXAMPLE OF MAPPING TABLE
(IN THE CASE OF DISK ARRAY SYSTEM)

| Vol ID | BLK ADDR | DEVICE ID | Port ID | Vol ID | BLK ADDR |
|--------|----------|-----------|---------|--------|----------|
| α | Ba | SD2 | TP2 | α2 | Ba2 |
| ⋮ | ⋮ | ⋮ | ⋮ | ⋮ | ⋮ |
| α | Bd | SD2 | TP2 | α2 | Bd2 |
| β | Ba | SD1 | INTERNAL | — | — |
| ⋮ | ⋮ | ⋮ | ⋮ | ⋮ | ⋮ |
| β | Bd | SD1 | INTERNAL | — | — |

(c) EXAMPLE OF MAPPING TABLE
(IN THE CASE WHERE THERE ARE PLURALITIES OF
SECOND STORAGE CONTROL DEVICES)

| Vol ID | BLK ADDR | DEVICE ID | Port ID | Vol ID | BLK ADDR |
|--------|----------|-----------|---------|--------|----------|
| α | Ba | SD2(1) | TP2(1) | α2A | Ba2 |
| ⋮ | Bb | SD2(1) | TP2(1) | α2A | Bb2 |
| ⋮ | Bc | SD2(2) | TP2(2) | α2B | Bc2 |
| α | Bd | SD2(2) | TP2(2) | α2B | Bd2 |

FIG.13

(a) EXAMPLE OF FUNCTION MANAGEMENT TABLE                TF

| DEVICE ID | Port ID | SUPPORT FUNCTION F1 | SUPPORT FUNCTION F2 | ... | SUPPORT FUNCTION Fn |
|---|---|---|---|---|---|
| SD2(1) | TP2(1) | POSITIVE | NEGATIVE | ... | POSITIVE |
| ⋮ | ⋮ | ⋮ | ⋮ | ⋮ | ⋮ |
| SD2(n) | TP2(n) | POSITIVE | POSITIVE | ... | NEGATIVE |

(b) HOST DEVICE → FIRST STORAGE CONTROL DEVICE

CH

| COMMAND CODE (COPY REQUEST) | ORIGINAL ADDRESS OF COPY TARGET (Ba-Bd) | DESTINATION DEVICE ID (BACKUP DEVICE) |
|---|---|---|

(c) FIRST STORAGE CONTROL DEVICE → SECOND STORAGE DEVICE

CS

| COMMAND CODE (COPY REQUEST) | ORIGINAL ADDRESS OF COPY TARGET (Ba2-Bd2) | DESTINATION DEVICE ID (BACKUP DEVICE) |
|---|---|---|

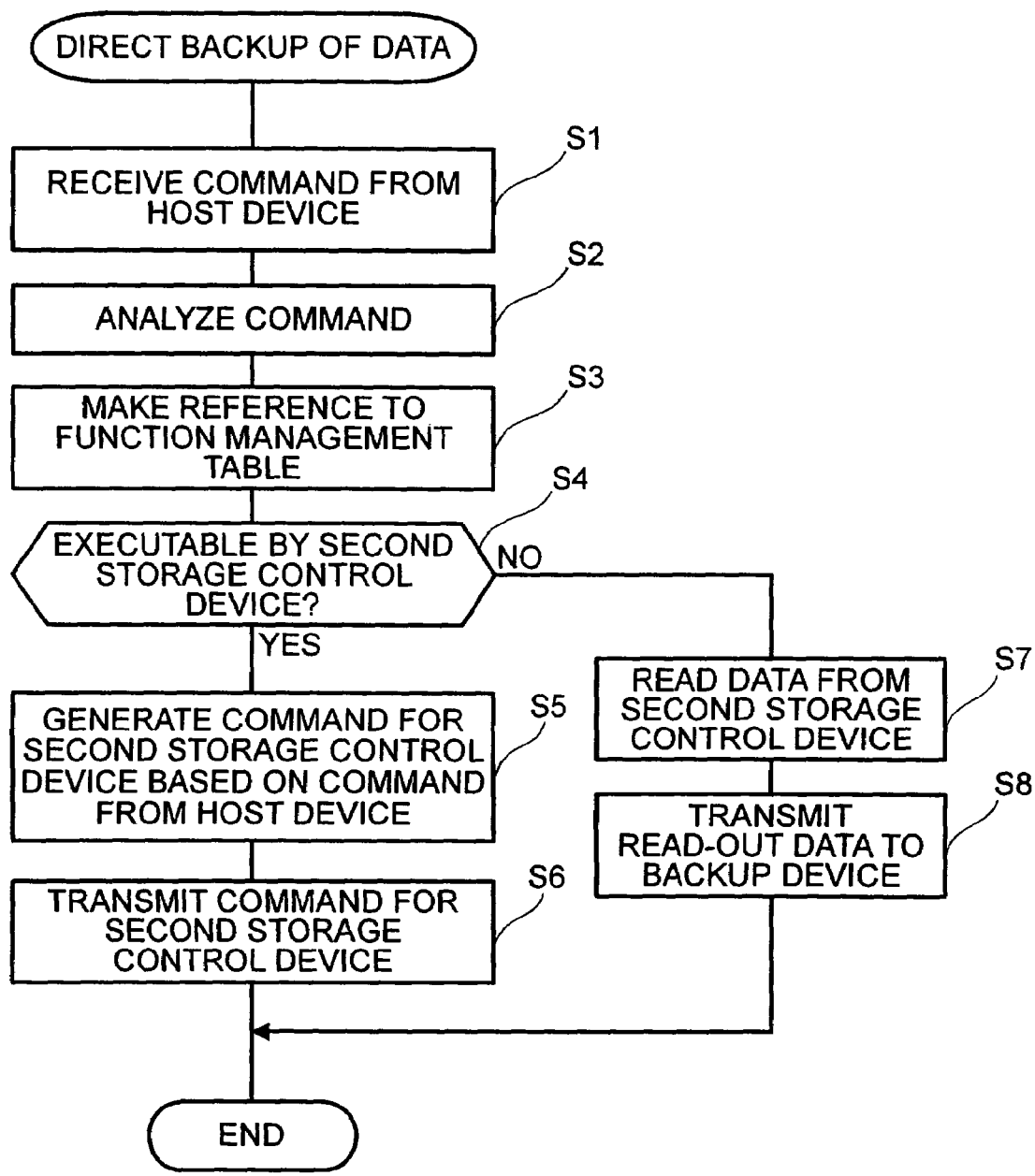

FIG.16

(a) EXAMPLE OF MAIN SITE SIDE MAPPING TABLE

| Vol ID | BLK ADDR | DEVICE ID | Port ID | Vol ID | BLK ADDR |
|---|---|---|---|---|---|
| $\alpha$ | Ba | SD2(1) | TP2(1) | $\alpha 2$ | Ba2 |
| ⋮ | ⋮ | ⋮ | ⋮ | ⋮ | ⋮ |
| $\alpha$ | Bd | SD2(1) | TP2(1) | $\alpha 2$ | Bd2 |

(b) EXAMPLE OF SUBSITE SIDE MAPPING TABLE

| Vol ID | BLK ADDR | DEVICE ID | Port ID | Vol ID | BLK ADDR |
|---|---|---|---|---|---|
| $\beta$ | Ba | SD2(2) | TP2(2) | $\beta 2$ | Ba2 |
| ⋮ | ⋮ | ⋮ | ⋮ | ⋮ | ⋮ |
| $\beta$ | Bd | SD2(2) | TP2(2) | $\beta 2$ | Bd2 |

(c) COMMAND STRUCTURE WHEN PERFORMING INITIAL COPY

| COMMAND CODE (INITIAL COPY START REQUEST) | ORIGINAL DEVICE ID (SD1(1)) | ORIGINAL Vol ID ($\alpha$) | DESTINATION DEVICE ID (SD1(2)) | DESTINATION Vol ID ($\beta$) |
|---|---|---|---|---|

FIG.19

(a) EXAMPLE OF MAIN SITE SIDE MAPPING TABLE

| Vol ID | BLK ADDR | DEVICE ID | Port ID | Vol ID | BLK ADDR |
|---|---|---|---|---|---|
| α | Ba | SD2(1) | TP2(1) | α2 | Ba2 |
| ⋮ | ⋮ | ⋮ | ⋮ | ⋮ | ⋮ |
| α | Bd | SD2(1) | TP2(1) | α2 | Bd2 |

(b) EXAMPLE OF SUBSITE SIDE MAPPING TABLE

| Vol ID | BLK ADDR | DEVICE ID | Port ID | Vol ID | BLK ADDR |
|---|---|---|---|---|---|
| β | Ba | SD2(2) | TP2(2) | β2 | Ba2 |
| ⋮ | ⋮ | ⋮ | ⋮ | ⋮ | ⋮ |
| β | Bd | SD2(2) | TP2(2) | β2 | Bd2 |

(c) EXAMPLE OF MAIN SITE SIDE FUNCTION CONTROL TABLE

| DEVICE ID | Port ID | SUPPORT FUNCTION F1 | SUPPORT FUNCTION F2 | ⋯ | SUPPORT FUNCTION Fn |
|---|---|---|---|---|---|
| SD2(1) | TP2(1) | POSITIVE | NEGATIVE | ⋯ | POSITIVE |

(d) EXAMPLE OF SUBSITE SIDE FUNCTION CONTROL TABLE

| DEVICE ID | Port ID | SUPPORT FUNCTION F1 | SUPPORT FUNCTION F2 | ⋯ | SUPPORT FUNCTION Fn |
|---|---|---|---|---|---|
| SD2(2) | TP2(2) | POSITIVE | POSITIVE | ⋯ | NEGATIVE |

(e) COMMAND STRUCTURE WHEN PERFORMING INITIAL COPY

| COMMAND CODE (INITIAL COPY START REQUEST) | ORIGINAL DEVICE ID (SD1(1)) | ORIGINAL Vol ID (α) | DESTINATION DEVICE ID (SD1(2)) | DESTINATION Vol ID (β) |
|---|---|---|---|---|

STORAGE SYSTEM AND STORAGE CONTROL DEVICE

CROSS-REFERENCE TO RELATED APPLICATIONS

This application is a Continuation application of U.S. application Ser. No. 10/768,439 now U.S. Pat. No. 7,111,138 filed Feb. 2, 2004. Priority is claimed based on U.S. application Ser. No. 10/768,439 now U.S. Pat. No. 7,111,138 filed Feb. 2, 2004, which claims the priority from Japanese Patent Application No. 2003-323120, filed on Sep. 16, 2003, the entire disclosure of which is incorporated herein by reference.

BACKGROUND OF INVENTION

1. Field of the Invention

The present invention relates to a storage system and a storage control device.

2. Description of the Related Art

For example, in a database system handling a large-scale data such as a data center, data is controlled using a storage system configured separately from a host computer. The storage system includes, for example, a disk array system. The disk array system includes a number of disk storage units disposed in an array, and is established based for example on RAID (Redundant Array of Independent Inexpensive Disks). At least one logical volume is formed in a physical storage area provided by a group of disk units, and the logical volume is provided to a host computer (more specifically, to a database program operated on the host computer). The host computer can execute writing and reading of data with respect to the logical volume by transmitting a predetermined command.

In accordance with development of information society, data to be controlled by databases increases day by day. Therefore, a storage control device of higher capability and of larger volume is desired. In order to meet such market requirement, new types of storage control devices have been developed. There are two conceivable methods for introducing the new storage control devices into the storage system. One is a method to configure a storage system with all new types of storage control devices (JP-T-10-508967) by entirely replacing an old type of storage control device with a new type of storage control device. The other one is a method to add a new type of storage control device to the storage system including an old type of storage control device to allow the old and new types of storage control devices to coexist.

When transferring completely from the old type of storage control device to the new type of storage control device (Patent Document 1), although functions and capabilities of the new type of storage control device can be utilized, the old type of storage control device cannot be used effectively. On the other hand, when attempt is made to allow the old type of storage control device and the new type of storage control device to coexist, the number of storage control devices configuring the storage system increases, and thus control and operation of the old and new types of storage control devices are complex.

SUMMARY OF THE INVENTION

In view of the problems described above, it is an object of the invention to provide a storage system and storage control device that can prevent concentration of a load to a specific storage control device and disperse the load.

It is another object of the invention to provide a storage system and a storage control device which can realize both logical concentration of storage resources and load-balancing by coordinating different storage control devices such as the old and new types of control units.

It is further object of the invention is, for example, to provide a storage system and a storage control device which can prevent concentration of the processing load to a sophisticated and high-performance storage control device and disperse the load while realizing a high-performance and large-capacity storage system.

Other objects of the invention will be apparent from a description of embodiments that will be presented below.

In order to solve the problem described above, a storage system according to the invention is a storage system including a first storage control device and a second storage control device connected so as to be capable of communicating with each other and executing data processing according to a request from a host device, wherein the first storage control device includes first control means for judging whether or not the second storage control device can execute a predetermined data processing relating to a first request received from the host device and, when it is judged that the second control unit can execute, generating a second request corresponding to the first request and transmitting it to the second storage control device, and wherein the second storage control device includes second control means for executing the predetermined data processing based on the second request received from the first storage control device.

The storage control device includes, for example, a disk array system or a fiber channel switch. The host device includes computers such as a personal computer or a main frame. The first storage control device and the second storage control device are connected to each other so as to be capable of communicating in both directions via a communication network, and the first storage control device and the host device are also connected to each other so as to be capable of communicating in both directions via a communication network. The second storage control device and the host device may also be connected to each other so as to be capable of communicating in both directions. The communication network includes, for example, LAN (Local Area Network), SAN (Storage Area Network), a private line, and Internet.

The host device transmits the first request to the first storage control device. This request includes, for example, a command code for specifying contents of request, and address information for specifying an address of data to be processed. Upon reception of the first request, the first control means of the first storage control device judges whether or not the second storage control device can execute a predetermined processing requested by the first request. The predetermined processing here includes various types of data processing, such as a support function (additional function) other than the simple data input/output. More specifically, when considering that a large processing which is relatively heavy in processing load, such as data backup, copying process between a pair of volumes, and mirroring, is the predetermined processing, a heavy load can be dispersed among devices other than the first storage control device.

When it is judged that the second storage control device can execute the predetermined processing, the first control means generates the second request corresponding to the first request, and transmits it to the second storage control device. The second request is information requesting the second storage control device to execute the predetermined processing. When the second storage control device receives the second request, the second control means executes the requested predetermined data processing based on the second request. In this manner, it is possible to make the second storage control device take over data processing, which is requested by the first storage control device via the first request, via the second request in place of the first storage control device.

Therefore, the processing load of the first storage control device is dispersed to the second storage control device to prevent an excessive load from concentrating the first storage control device, and the information processing resources of the first storage control device (ex. CPU processing capability, memory capacity) can be allocated to services for the host devices. When the first storage control device is a new type storage control device, the high-performance services that the first storage control device possesses can be provided to the host devices effectively, thereby improving the entire efficiency of the storage system.

According to an embodiment of the invention, the first storage control device virtually provides a second storage area controlled by the second storage control device to the host device as the first storage area under control of its own, and the first request requests the data processing relating to the first storage area.

The second storage control device is provided with an actual storage area provided by the storage unit such as a disk drive. Such storage area which actually exists is also referred to as an actual storage area in this specification. The first storage control device virtually provides the second storage area, which is the actual storage area of the second storage control device, to the host device as if it were the storage area of its own. Therefore, the first storage control device itself is not required to have the physical storage area, and is capable of using the intelligent switching mechanism having a microcomputer system or the like (such as a fiber channel switch) as the first storage control device. The first storage control device may be, for example, a disk array system having a physical storage area (disk array subsystem). When the first storage control device is configured of the disk array system, a storage area larger than the storage area which it actually possesses can be provided to the host device since the second storage area of the second storage control device is loaded.

The host device requests data operation for the virtually provided first storage area by issuing the first request. However, the actual data is stored in the second storage area of the second storage control device. The first request, being directed to the first storage area which actually exists in the second storage area, can make the second storage control device execute the requested predetermined data processing. When the request from the host device is data processing, such as status request of the first storage control device or a backup process of control information which should be executed (or is preferably to be executed) by the first storage control device itself, the first storage control device itself can execute the processing and response to the host device without committing the task to the second storage control device.

According to an embodiment of the invention, the first storage control device is to retain storage areas correspondence information indicating correspondence between the first storage area and the second storage area and to virtually provide the first storage area to the host device based on the storage areas correspondence information, so that the first storage means can execute data processing directed to the first storage area by the first request based on the storage areas correspondence information.

The storage area correspondence information indicates correspondence of the second storage area which is allocated as the first storage area, and is stored in a storage means (such as semiconductor memory) in the first storage control device as a mapping table or the like. The storage areas correspondence information can be generated and stored by manual operation of an operator, or by automatic processing, for example, at the time of definition of the storage system configuration.

According to one embodiment of the invention, the second request is configured to have the similar data structure to the first request.

Since the first request and the second request have the same data structure, the second storage control device which received the second request can execute data processing as if it were directly commanded by the host device. In other words, if the data structure of the second request differs from that of the first request, it is necessary to add a function to receive and interpret the second request to the second storage control device. However, configuring the second request to have the similar data structure to the first request, the second storage control device can be effectively utilized without adding special functions to the second storage control device.

According to an embodiment of the invention, the first control means confirms whether or not the second storage control device can execute the predetermined data processing relating to the second request before transmitting the second request to the second storage control device.

By confirming whether or not the second storage control device can execute the predetermined data processing requested by the second request before transmitting the second request, useless request is prevented in advance from being transmitted to the second storage control device. In the case where the second storage control device cannot execute the predetermined processing and thus the first storage control device executes it, the first storage control device can execute the predetermined processing immediately without transmitting the useless request and waiting for error response returning from the second storage control device.

According to an embodiment of the invention, the first storage control device retains function management information showing data processing functions executable by the second storage control device, and the first control means judges whether or not the second storage control device can execute the predetermined data processing relating to the second request based on the function management information.

The function management information may be configured by associating each function such as data backup, copying process between a pair of volumes, and mirroring with information indicating whether or not the corresponding function can be executed (can be used). Alternately, it is also possible to control only functions that can be executed by the second storage control device based on the function management information.

The function management information can be generated manually or automatically at the time of definition of the storage system configuration.

According to an embodiment of the invention, a backup device connected to both of the first storage control device and the second storage control device so as to be capable of communicating with each other is provided, and in the case where data processing relating to the first request is backup processing for transmitting and storing information stored in the first storage area to the backup device, the first control means judges whether or not the second storage control device can execute the backup processing and, when it is judged that the second storage control device can execute the backup processing, generates the second request and transmits it to the second storage control device by converting the address of the first storage area contained in the first request into the address in the second storage area. The second control means transfers and stores information stored in the second storage area to the backup device based on the second request.

When the storage system is provided with a backup device to backup data, the host device transmits the first request which requests backup processing to the first storage control device regularly or irregularly. The first storage control device (first control means) which received the first request judges whether or not the second storage control device can execute the backup processing, and when it is judged to be executable, generates the second request and transmits it to the second storage control device. The second storage control device which received the second request transfers and stores information stored in the second storage area (data or control information) to the backup device as if it were commanded directly by the host device. Therefore, the first storage control device can make the second storage control device take over the backup request that the first storage control device received, and use its own information processing resources for providing other services to the host device correspondingly.

According to an embodiment of the invention, the first storage control device further provides a first secondary storage area, which pairs with the first storage area, virtually, and the second storage control device further includes a second secondary storage area, which pairs with the second storage area. In the case where the predetermined data processing relating to the first request is internal copying process for copying information stored in the first storage area into the first secondary storage area, the first control means judges whether or not the second storage control device can execute the internal copying process and, when it is judged that the second storage control device can execute the internal copying process, generates and transmits the second request to the second storage control device by converting the address of the first storage area contained in the first request to the address of the second storage area. The second control means copies information stored in the second storage area into the second secondary storage area based on the second request.

The first storage control device and the second storage control device each include two storage areas. One of the storage areas is a primary storage area and the other storage area is a secondary storage area. The primary storage area and the secondary storage area pair with each other and store identical data. When the host device requests the first storage control device to execute the internal copying process for copying information stored in the primary first storage area to the secondary first storage area, the first control means judges whether or not the second storage control device can execute the internal copying process and, when it is judged to be executable, converts the address in the first request into the address in the second storage control device and generates the second request. In other words, since the first request is directed to the first storage area of the first storage control device, the address contained in the first request is an address representing a specific storage space in the first storage area. Therefore, the first control means generates the second request by converting the address in the first storage area to the corresponding address in the second storage address. Accordingly, the second storage control device stores information stored in the primary second storage area, which is an actual storage area, into the secondary second storage area, which is an actual storage area as if it were commanded directly by the host device. Therefore, the first storage control device makes the second storage control device take over the internal copying process and uses its own information processing resources to other services.

According to an embodiment of the invention, there is provided a subsite which pairs with a main site in which the first storage control device and the second storage control device are provided, and connected to the main site so as to be capable of communicating with each other. The subsite includes a remanent first storage control device and a remanent second storage control device, and the remanent first storage control device virtually provides a remanent second storage area controlled by the remanent second storage control device as a remanent first storage area which is controlled by the remanent first storage control device. When the predetermined data processing relating to the first request is external copying process for copying information stored in the first storage area to the remanent first storage area of the subsite, the first control means of the main site judges whether or not both of the second storage control device and the remanent second storage control device can execute the external copying process and, when it is judged that the respective second storage control device can execute the external copying process, generates the second request corresponding to the first request and transmits it to the second storage control device, and then the second control means executes the external copying process by copying information stored in the second storage area to the remanent second storage area based on the second request.

The storage system may include two sites; a main site (primary site, local site) and a subsite (secondary site, remote site) installed at a location away from the main site. The main site includes the host device, the first storage control device, and the second storage control device, while the subsite includes the remanent first storage control device and the remanent second storage control device. The subsite is a backup site of the main site, and the first storage control device of the main site pairs with the remanent first storage control device of the subsite. In each of the main site and the subsite, the first storage control device (the remanent first storage control device) makes out the actual storage area (second storage area, remanent second storage area) which is actually presented by the second storage control device (remanent second storage control device) to be the storage area of its own (first storage area, remanent first storage area). Therefore, the second storage control device and the remanent second storage control device in each of the main and the sub sites pair with each other.

The first storage area, which the first storage control device installed in the main site virtually provides to the host device, is a primary volume, and the first storage area, which the first storage control device installed in the subsite virtually provides, is a secondary volume which pairs with the primary volume. The host device requests the external copying process to the first storage control device in the main site regularly or irregularly. The external copying process means the processing for copying information in the main site to the subsite. When the external copying process is requested via the first request, the first control means belonging to the main site judges whether or not the second storage control devices in both of the main and sub sites can execute the external copying process. When the second storage control devices installed in both sites can execute the external copying process, the first control unit belonging to the main site generates the second request corresponding to the first request and transmits the second request to the second storage control device installed in the main site. Accordingly, the second storage control device installed in the main site read data stored in the second storage area and transmits it to the second storage control device installed in the subsite, and stores it in the second storage area in the subsite. The second request here is generated by converting the copy-from address or the copy-to address expressed in the first request into the address in the second storage areas in both of the main and sub sites. Accordingly, the external copying process is executed between the second storage control devices in both of the main and sub sites in which data or control information is actually stored, and the first storage control devices in both of the main and sub sites are not directly involved in the external copying process. Therefore, the first storage control device installed in the main site does not spend information processing resources for executing the external copying process, and can provide services to the host device using the corresponding information processing resources.

Here, the remanent first storage control device installed in the subsite retains remanent function management information indicating data processing functions that the remanent second storage control device can execute, and the first control means in the main site can judge whether or not the remanent second storage control device can execute the external copying process by sending inquiries to the remanent first storage control device in the subsite before transmitting the second request to the second storage control device.

In other words, information on the data processing function that the remanent second storage control device installed in the sub site can execute is retained by the remanent first storage control device installed in the sub site as function management information for the subsite. Therefore, the first storage control device installed in the main site judges whether or not the remanent second storage control device in the subsite can execute the external copying process by sending inquiries to the remanent first storage control device in the sub site before transmitting the second request. Information on the data processing functions that the second storage control device installed in the main site can execute is retained by the first storage control device installed in the main site as function management information for the main site.

According to an embodiment of the invention, the first storage control device retains storage areas correspondence information indicating correspondence between the first storage area and the second storage area, and the remanent first storage control device retains remanent storage areas correspondence information indicating correspondence between the remanent first storage area and the remanent second storage area. The first control means transmits respective storage areas correspondence information when transmitting the second request to the second storage control device.

Accordingly, the second storage control device installed in the main site can execute the external copying process while comprehending information on the copy-from and copy-to storage spaces.

According to an embodiment of the invention, the first storage control device includes a renewed positional information retaining means for retaining information relating to the first storage area renewed by the host device during external copying process, and when the external copying process is completed, the first control means generates the second request, reads renewed information from the second storage control device, and transmits read information so as to store information renewed in the first storage area to the remanent first storage area based on the renewed positional information retaining means.

In other words, there is a case in which the host device accesses the first storage control device installed in the main site and renews data while the external copying process is being executed between the second storage control devices installed respectively in the main and sub sites. Therefore, information relating to information renewed during the external copying process (for example, information on renewed logical block address) is stored in the renewed positional information retaining means and then renewed information is reflected on the second storage area in the subsite after the external copying process is completed.

A control method according to another aspect of the invention is a control method including a first storage control device and a second storage control device connected so as to be capable of communicating with each other for controlling a storage system for executing data processing according to requests from a host device, the first storage control device performing the steps of receiving a first request from the host device, judging whether or not the second storage control device can execute a predetermined data processing relating to the received first request, generating a second request corresponding to the first request when it is judged that the second storage control device can execute the predetermined data processing, and transmitting the generated second request to the second storage control device, and the second storage control device executing the steps of receiving the second request from the first storage control device, and executing the predetermined data processing based on the received second request.

A storage control device according to further aspect of the invention is a storage control device connected to a second storage control device and a host control so as to be capable of communicating with each other for executing data processing according to a request from a host device, including receiving means for receiving a first request from the host device, judging means for judging whether the second storage control device can execute a predetermined data processing relating to the received first request, requesting means for generating a second request corresponding to the first request when it is judged that the second storage control device can execute the predetermined data processing, and transmitting means for transmitting the generated second request to the second storage control device.

A program according to the invention is a program connected to a second storage control device and a host device so as to be capable of communicating with each other for controlling a first storage control device for executing data processing according to a request from the host device, implementing the functions of judging whether or not the second storage control device can execute a predetermined data processing relating to the first request received from the host device, generating a second request corresponding to the first request when it is judged that the second storage control device can execute the predetermined data processing, and transmitting the generated second request to the second storage control device on a computer of the first storage control device.

BRIEF DESCRIPTION OF THE DRAWINGS

FIG. 9A is a mapping table of a case in which the first storage control device is configured as a fiber channel switch, FIG. 9B is a mapping table of a case in which the first storage control device is configured as a disk array system, and FIG. 9C is a mapping table of a case in which the virtual LU is configured of a plurality of actual LUs.

FIG. 13A shows a function management table, FIG. 13B shows a data structure of a command transmitted from the host device to the first storage control device, and FIG. 13C shows a data structure of a command transmitted from the first storage control device to the second storage control device.

FIG. 14 is a flowchart schematically showing processing in the first storage control device in the case of executing direct backup of data.

FIG. 16A shows a mapping table in the main site, FIG. 16B shows a mapping table in the subsite, and FIG. 16C shows a data structure of the initial copy start command, respectively.

FIG. 19A shows a mapping table in the main site, FIG. 19B shows a mapping table in the subsite, FIG. 19C shows a function management table in the main site, FIG. 19D shows a function management table in the subsite, and FIG. 19E shows a data structure of an initial copy start command.

DESCRIPTION OF THE PREFERRED EMBODIMENTS

Referring now to FIG. 1 to FIG. 22, an embodiment of the invention will be described.

In the invention, as is described in detail below, a first storage control device virtually provides an actual storage area, which is provided by the second storage control device, to a host computer as if it is its own storage area, and commits processing that the second storage control device can execute to the second storage control device. In other words, in the invention, logically centralized control can be executed for dispersing physical storage resources by the first storage control device, and a specific heavy load processing is dispersed for execution under the condition in which centralized control is enabled.

The first storage control device here may include a plurality of operating modes. A first mode is peculiar to the invention, in which a virtual storage area is provided to the host computer and the processing that can be executed by the second storage control device is committed to the second storage control device. A second mode is a mode in a prerequisite structure of the invention, in which a virtual storage area is provided to the host computer and processing that can be executed by the second storage control device is executed by the first storage control device. A third mode is a mode which is known in the related art, in which a virtual storage area is not provided, but the processing for the actual storage area is executed by the first storage control device. A storage system according to the invention includes at least the first mode. It may further include the second mode and the third mode. The storage system including a plurality of operating modes is not known in the related art, but is one of the characteristics of the invention.

[Embodiment 1]

Summary of Entire Configuration

Figure 1:
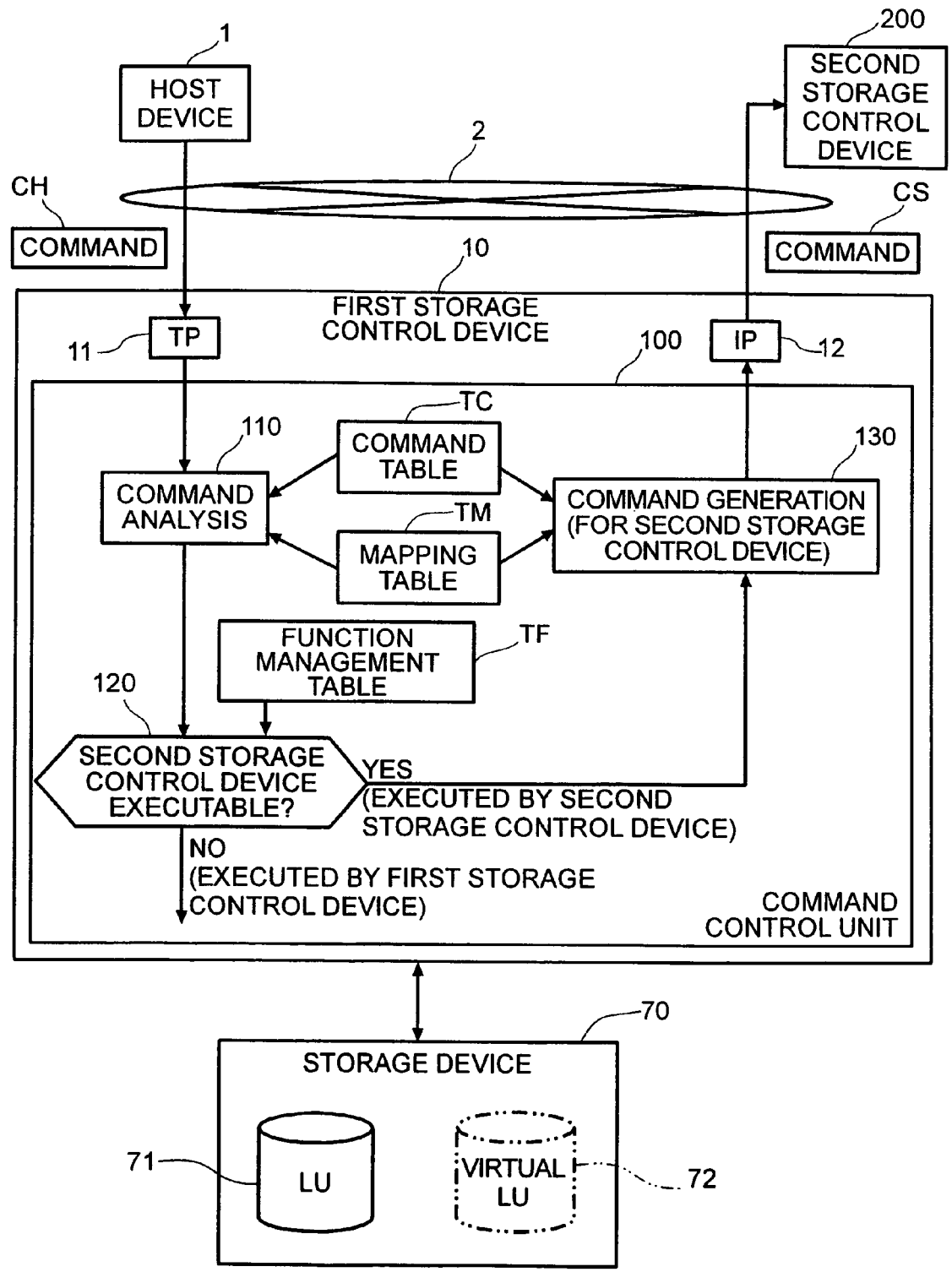
FIG. 1 is a block diagram schematically showing a principal portion of a storage system according to a first embodiment of the invention.

Referring now to FIG. 1 to FIG. 9, a configuration of an embodiment according to the invention will be described. FIG. 1 is a block diagram showing the configuration of the principal portion of the storage system according to the embodiment.

A host device 1 is a computer device including information processing resources such as a CPU (Central Processing Unit) or a memory, and is configured as a personal computer, a work station, a main frame, or the like. The host device 1 includes information input devices (not shown) such as a keyboard switch, pointing device, and microphone, and information output devices (not shown) such as a monitor display, a speaker, and the like. The host device 1 includes RAID manager for controlling RAID or a database management program installed therein.

The host device 1 is connected to a first storage control device 10 and a second storage control device 200, which will be described later, so as to be capable of communicating with each other in both directions via a communication network 2. The communication network 2 may be selected from, for example, LAN, SAN, Internet, a private line, and a public line, depending on the case. The data communication via LAN is executed according to, for example, TCP/IP (Transmission Control Protocol/Internet Protocol) protocol. When the host device 1 is connected to the first storage control device 10 or the like via LAN, the host device 1 specifies a file name and requests data input/output in files. When the host device 1 is connected to the first storage control device 10 or the like via SAN, the host device 1 requests data input/output in blocks, which is a data control unit in the storage area provided by a plurality of disk storage devices (disk drives) according to the fiber channel protocol.

The host device 1 and the first storage control device 10, the first storage control device 10 and the second storage control device 200, and the host device 1 and the second storage control device 200 may be connected respectively by separate communication networks, or by a common communication network 2 as shown in the drawing. When the communication network between the first storage control device 10 and the host device 1 differs from the communication network between the first storage control device 10 and the second storage control device 200, a second request may be transmitted from the first storage control device 10 to the second storage control device 200 by executing protocol conversion or the like.

The first storage control device 10 is a computer system configured as a disk array system or a fiber channel switch, as will be described later. The first storage control device 10 virtually provides a logical storage area set on a physical storage area provided by the second storage control device 200 (logical volume (Logical Unit)) to the host device 1 as if the first storage control device itself provides.

In the description below, the logical volume may be referred to as LU, and the LU provided virtually by the first storage control device 10 may be referred to as virtual LU. The LU which actually exists may be referred to as actual LU. In the drawings, the virtual LU is represented by a virtual line (chain double-dashed line), and the actual LU is represented by a solid line. When the first storage control device 10 is configured of the disk array system, the first storage control device 10 includes both of the virtual LU and the actual LU. It may be considered that the actual LU is a virtual LU having its physical actual storage area in the first storage control device 10, or under the direct control of the first storage control device 10. If it is considered in this manner, it is also possible to refer to the virtual LU having a substance of the storage area in the second storage control device 200 as a virtual external LU and, in contrast, the virtual LU having a substance of the storage area in the first storage control device 10 as a virtual internal LU.

In this manner, since the first storage control device 10 provides the LU of the second storage control device 200 to the host device 1 as the virtual LU, the first storage control device 10 itself is not required to have the actual LU. Therefore, even the fiber channel switch that is not provided with a disk drive for providing a physical storage area can be used as the first storage control device 10 as long as it has a required information processing capability.

The first storage control device 10 is provided with ports 11, 12 for communicating with the host device 1 or the second storage control device 200 and a command control unit 210. When the first storage control device 10 is configured of the disk array system, the first storage control device 10 is provided with a storage device 70. The storage device 70 includes a plurality of devices such as hard disk, flexible disk, magnetic tape, semiconductor memory, or optical disk, and a LU 71 is set in these physical storage areas. The first storage control device 10 provides a virtual LU 72 which is established by mapping the actual LU of the second storage control device 200. In FIG. 1, for the sake of convenience of description, the storage device 70 includes the actual LU 71 and the virtual LU 72. The storage device 70 can be connected to the first storage control device 10 directly or via a communication network. Alternatively, the storage device 70 and the first storage control device 10 can be combined together into a unit.

The respective ports 11, 12 are used for transmitting and receiving data. One of the ports 11 is a target port (TP) which receives requests from the host device 1, and the other port 12 is an initiator port (IP) for transmitting requests to the second storage control device 200. Both of these ports 11, 12 are identical in configuration, and serve as the target port or the initiator port depending on the role to play for data communication.

The command control unit 100 is implemented by information processing resources (CPU, memory, I/O circuit, etc.) provided in the first storage control device 10, or by software. The command control unit 100 can be implemented by a main controller (not shown) of the first storage control device 10, or by coordination with a channel adapter or a disk adapter. The command control unit 100 includes a command analysis unit 110, a judgement unit 120, a command generation unit 130, a command table TC, a mapping table TM, and a function management table TF.

The command analysis unit 110 analyzes a command (request) received from the host device 1 via the port 11 based on the command table TC. The command table TC includes various command codes registered in advance, so that what the command code contained in the request from the host device 1 request can be judged by making reference to the command table TC.

The judgement unit 120 judges whether or not the second storage control device 200 can execute a data processing relating the request received from the host device 1. The judgement unit 120 judges whether or not the second storage control device 200 is provided with the requested data processing function by making reference to the function management table TF. The function management table TF, which will be described later in detail, is generated, for example, at the time of definition of the storage system configuration, and support functions implemented in the second storage control device 200 are registered therein.

The command generation unit 130 converts the request received from the host device 1 for the second storage control device 200. The command generation unit 130 generates a request so that the second storage control device 200 can execute the data processing requested by the host device 1 by making reference to the command table TC and the mapping table TM. The mapping table TM shows correspondence of the LU of the second storage control device 200 to the virtual LU of the first storage control device 10. The command generation unit 130 converts an address for the storage space of the virtual LU into an address for the storage space of the actual LU.

In this manner, the command control unit 100 analyzes the first request received from the host device 1, and judges whether or not the second storage control device 200 can execute the data processing (support function) requested via the first request. When it is judged that the second storage control device 200 can executed the data processing, the command control unit 100 generates a second request corresponding to the first request, and transmits the second request from the port 12 to the second storage control device 200 via the communication network 2. When the second storage control device 200 cannot execute the data processing requested by the host device 1, the first storage control device 10 executes the requested data processing.

[In the Case Where the First Storage Control Device is Applied to the Disk Array System]

Figure 2:
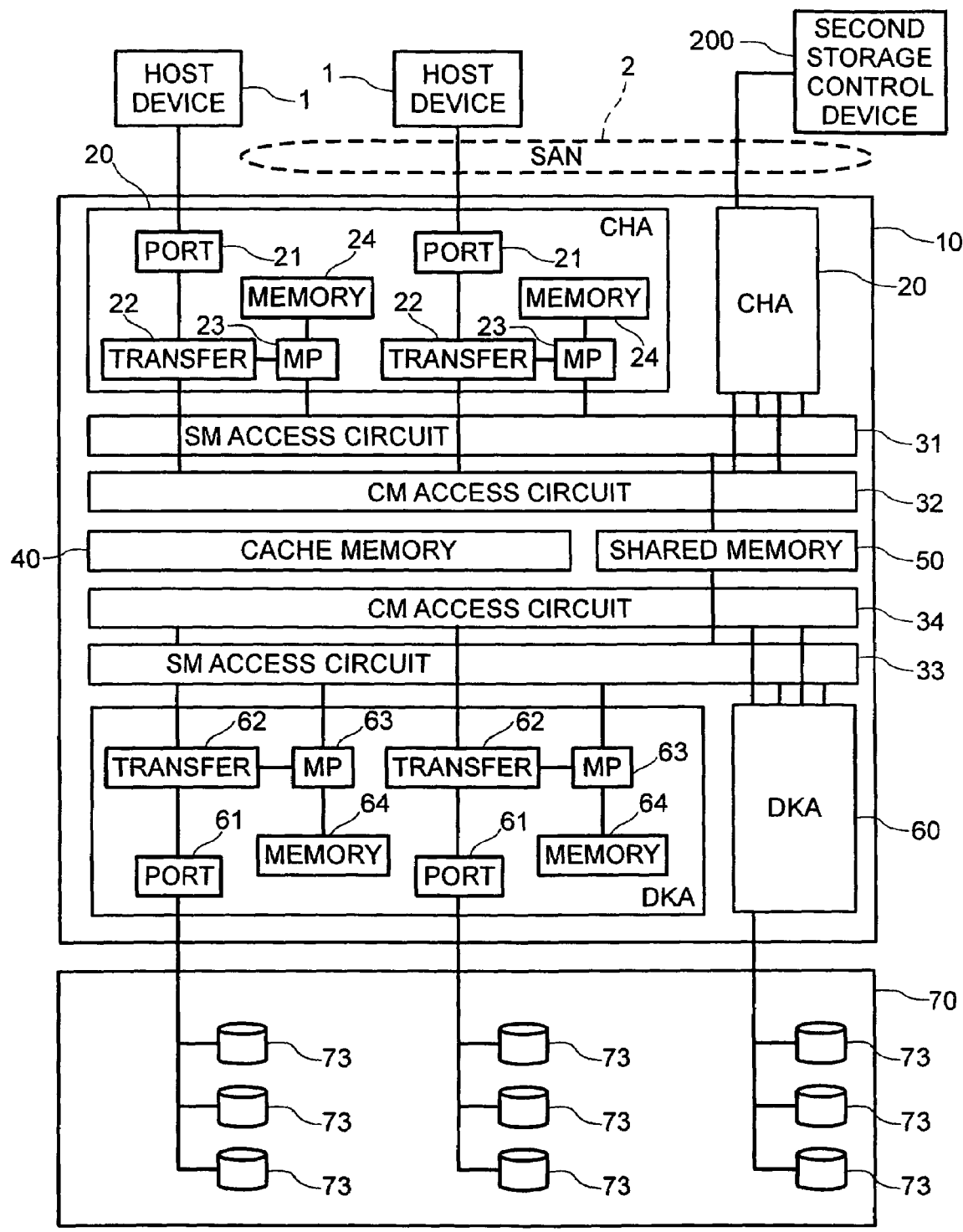
FIG. 2 is a block diagram of a case in which the first storage control device is configured of a disk array system.

FIG. 2 is a block diagram showing a detailed example when the first storage control device 10 is configured as the disk array system. The first storage control device 10 may include, for example, a plurality of channel adapters 20, a cache memory 40, a shared memory 50, a plurality of disk adapters 60, and the storage device 70, as will be described respectively later. Though not shown, the first storage control device 10 may include, for example, a MPU (Micro Processing Unit) for controlling the operation of the first storage control device 10 as a whole and a maintenance control terminal for setting environment, controlling various statuses, and so on.

The channel adapters (CHA) 20 execute data communication with the host device 1. Each channel adapter 20 includes a communication port 21 for communicating with the host device 1 or the like, a transfer unit 22 for transferring received data, a micro processor (abbreviated as MP) 23 for controlling the operation in the channel adapter, and a memory 24. The command control unit 100 for interpreting and processing various commands received from the host device 1 is implemented by the microprocessor 23. Alternatively, the command control unit 100 may be implemented by the MPU, which generally manages the entire device, or the command control unit 100 may be implemented by coordination of the MPU with the channel adapters 20, coordination of the MPU with the channel adapters 20 and the disk adapter 60, and coordination of the channel adapter 20 with the disk adapter 60.

The channel adapters 20 each have a network address for identification (for example, IP address, or WWN (World Wide Name) allocated thereto, and the respective channel adapters 20 are configured to act individually as a DAS (Direct Attached Storage) or as a NAS (Network Attached Storage). In other words, each channel adapter 20 can receive a request from each host device 1 individually. Each channel adapter 20 may include a plurality of control circuits each configured of a port 21, a transfer unit 22, a microprocessor 23, and a memory 24.

Each microprocessor 23 is connected to the shared memory 50 via a host-side shared memory access circuit 31, and writes control information into the shared memory 50 or makes reference to control information written in the shared memory 50. Each transfer unit 22 is connected to the cache memory 40 via a host-side cache memory access circuit 32, and stores data received from the host device 1 in the cache memory 40 or reads data stored in the cache memory 40 and transmits it to the host device 1. The cache memory 40 and the shared memory 50 are storage means shared by the channel adapters 20 and the disk adapter 60. The cache memory 40 mainly includes data stored therein, and the shared memory 50 mainly includes control information and command stored therein. A work area is also set in the shared memory 50. The command table TC, the mapping table TM, and the function management table TF described above may be stored, for example, in the shared memory 50, or may be stored in the cache memory 40.

Each disk adapter (DKA) 60 controls data input/output between the storage device 70 and a group of disk devices 73. The disk adapter 60 writes data that the channel adapter 20 received from the host device 1 into a predetermined address in the group of disk devices 73 according to the writing request from the host device 1. At this time, each disk adapter 60 converts a logical address in the logical volume into a physical address in a physical disk. The disk adapter 60 can perform data access according to the RAID configuration and execute copy management control or backup control of data stored in the group of disk devices 73 when the group of disk devices 73 is controlled by the RAID. In addition, the disk adapter 60 can control the task to store a copy of data in the primary site to the secondary site (replication function or remote copying function) for preventing data loss at a time of disaster.

Each disk adapter 60 may include a plurality of control circuits each including a communication port 61, a transfer unit 62, a microprocessor 63, and a memory 64. Each communication port 61 performs data communication between a storage device and a group of disk devices 73. Each transfer unit 62 is connected to the cache memory 40 via a device-side cache memory access circuit 34 for transferring data written in the cache memory 40 to the group of disk devices 73 or writing data read from the group of disk devices 73 into the cache memory 40. The microprocessor 63 is connected to the shared memory 50 via a device-side shared cache memory access circuit 33 so as to be capable of making reference to control information or commands written in the shared memory 50.

The host-side shard memory access circuit 31 and the device-side shared memory access circuit 33, and the host-side cache memory access circuit 32 and the device-side cache memory access circuit 34 may be configured as a high-speed bus, such as an ultra high-speed cross-bus switch, for transmitting data by high-speed switching operation.

Figure 3:
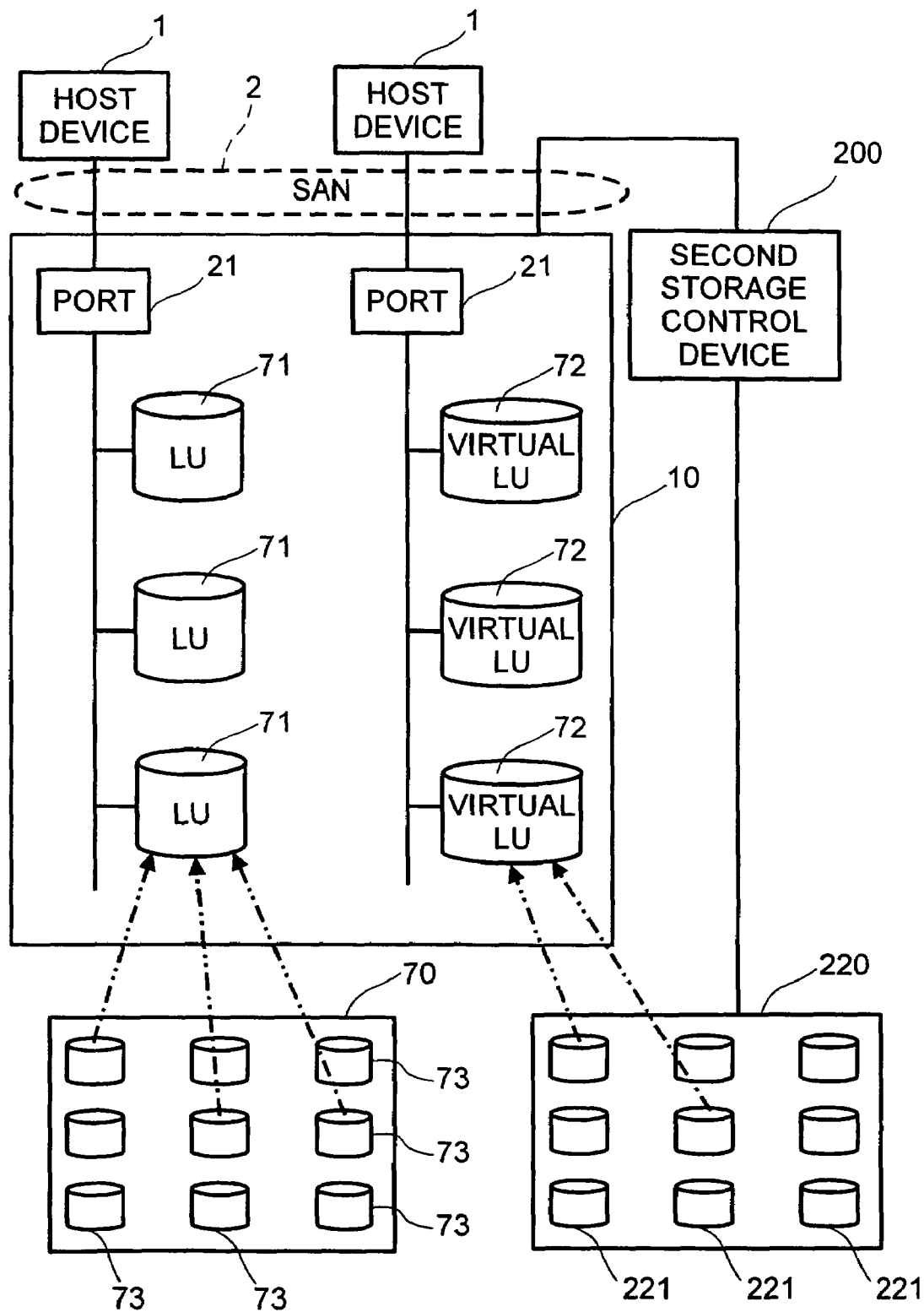
FIG. 3 is an explanatory drawing schematically showing a logical structure of the disk array system shown in FIG. 2 when viewed from the host device.

FIG. 3 is a block diagram showing a principal portion of a logical configuration when viewing the first storage control device 10 from the host device 1. The first storage control device 10 provides two types of LUs to the host device 1. One is an actual LU 71 provided by the physical group of disk devices 73 in the storage 70 controlled directly by the first storage control device 10. The other one is a virtual LU 72, which is an actual LU provided by a group of disk devices 221 in the storage device 220 controlled by the second storage control device 200 as the LU of the first storage control device 10. As shown in FIG. 3, a plurality of actual LUs 71 and a plurality of virtual LUs 72 may be provided. The LUs 71, 72 each include a group of a plurality of disk devices. A method for controlling the virtual LU 72 provided by the first storage control device 10 and the storage device 220 controlled by the second storage control device 200 is written in Japanese Patent Application No. 2003-337239, filed on Sep. 29, 2003. The entire disclosure in Japanese Patent Application No. 2003-337239, filed on September 29 is incorporated-herein by reference.

[In the Case Where the First Storage Control Device is Applied to the Fiber Channel Switch]

Figure 4:
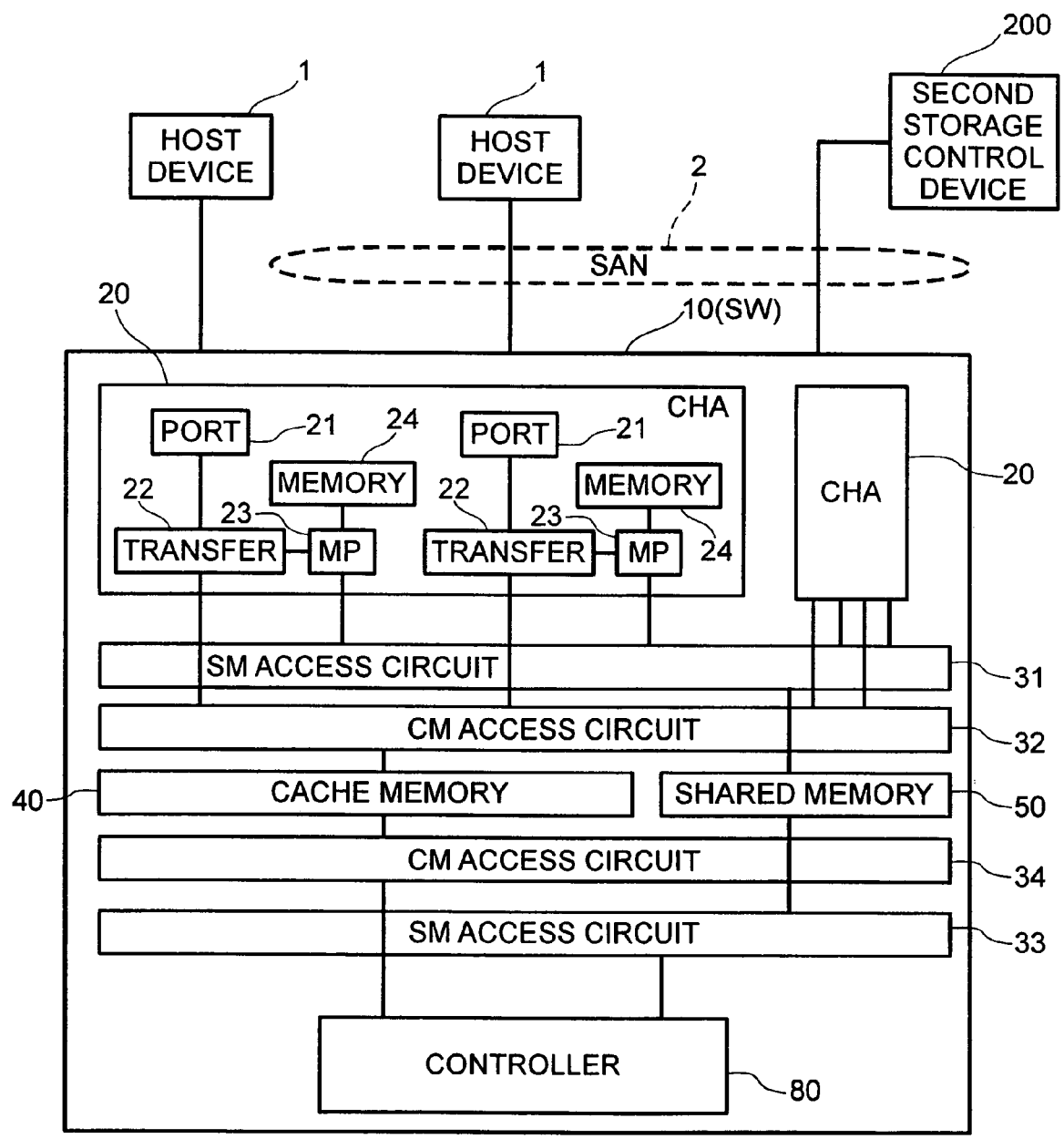
FIG. 4 is a block diagram showing a case in which the first storage control device is configured of a fiber channel switch.

Subsequently, FIG. 4 is a block diagram showing a detailed example of the case in which the first storage control device 10 is configured as an intelligent fiber channel switch. In order to differentiate from the case of being configured as the disk array system, reference sign (SW) is added to the reference numeral 10 in the drawing. The first storage control device 10 includes a plurality of channel adapters 20, shared memory access circuits 31, 33, cache memory access circuits 32, 34, a cache memory 40, a shared memory 50, and a controller 80. Detailed description of the channel adapter 20 and the like will be omitted since they are described in conjunction with FIG. 2. The controller 80 generally controls the operation as a whole, and is provided with the MPU and the memory.

A significantly different point from those shown in FIG. 2 is that the first storage control device 10 configured as the fiber channel switch does not include the storage device 70 to be directly controlled.

Figure 5:
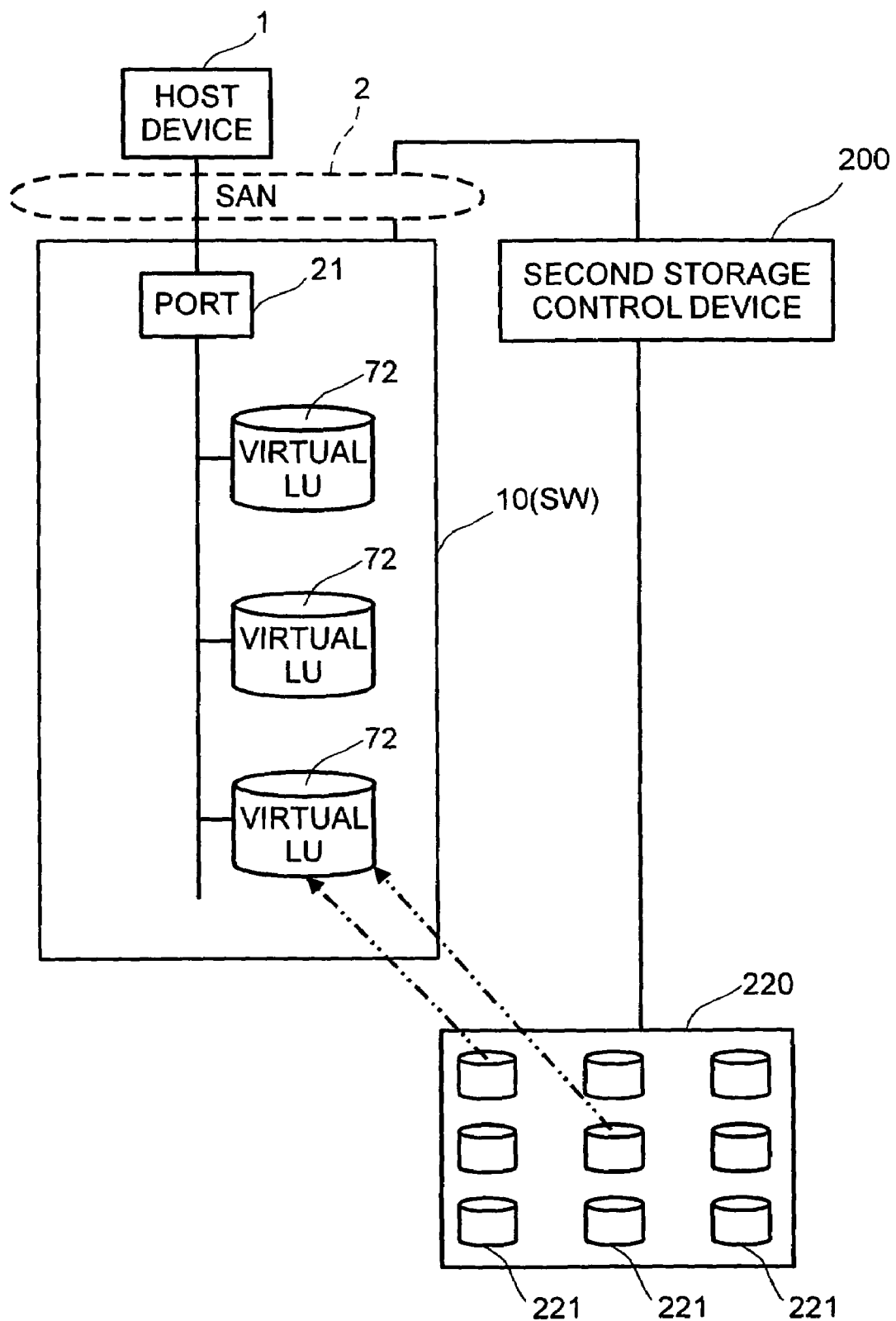
FIG. 5 is an explanatory drawing schematically showing a logical structure of the fiber channel switch shown in FIG. 4 when viewed from the host device.

FIG. 5 is a block diagram showing a principal portion of logical configuration when viewing the first storage control device 10 configured as the fiber channel switch from the host device 1. As shown in the drawing, the first storage control device 10 does not have the actual LU, but have at least one virtual LU 72. As described above, the substance of the virtual LU 72 actually exists in the storage device 220 of the second storage control device 200.

[Data Access to Virtual LU]

Figure 6:
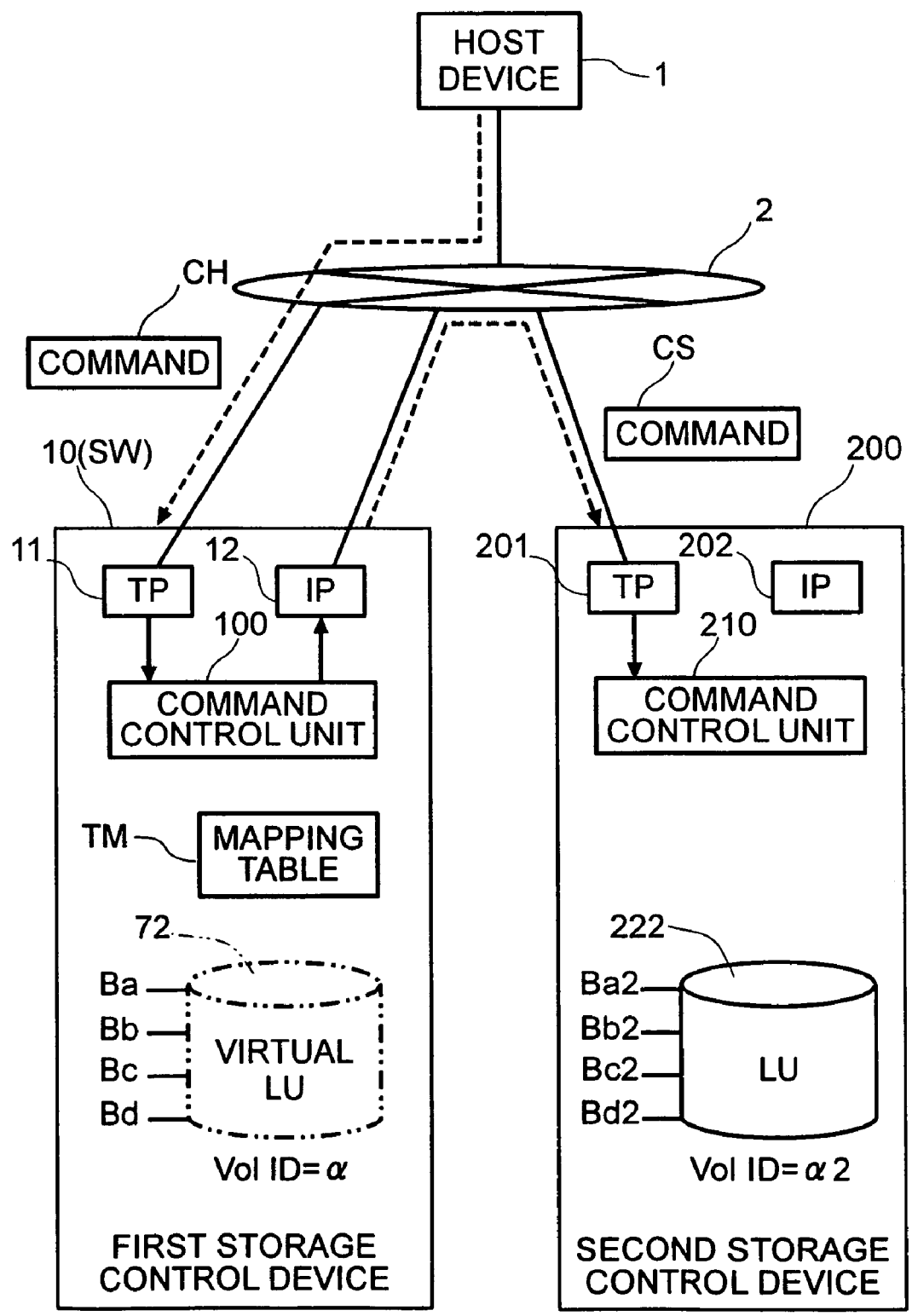
FIG. 6 is a schematic block diagram showing an example in which data is read/written from/into the second storage control device from the first storage control device.

Subsequently, referring to FIG. 6, data access to the virtual LU 72 will be described. FIG. 6 shows a case in which the first storage control device 10 is configured as the fiber channel switch.

When the host device 1 requests the virtual LU 72 to write or read data, the host device 1 generates a command CH to the first storage control device 10. The command CH contains information for identifying the first storage control device 10 (Port ID, WWN, etc.) a command code (write command, read command, etc.), and an address for reading target data (in case of read command). The command CH from the host device 1 is received by a target port 11 of the first storage control device 10 via the communication network 2 such as SAN, and supplied to the command control unit 100.

The command control unit 100 analyzes the received command CH, and makes reference to the mapping table TM to execute the data processing requested from the host device 1. When the first storage control device 10 is configured of the fiber channel switch, the mapping table TM may be configured, for example, as shown in FIG. 9A. The mapping table TM maybe configured by coordinating a volume ID (VOL ID) for identifying the virtual LU (virtual logical volume ) 72, a logical block address (BLK ADDR) set in the virtual LU 72, a device ID for identifying the second storage control device 200 having the actual LU 222 corresponding to the virtual LU 72, a port ID for identifying the port corresponding to the actual LU 222, a volume ID for identifying the actual LU 222, and a logical block address set to the actual LU 222 corresponding to the logical block address of the virtual LU 72, respectively. Therefore, by making reference to the mapping table TM, one can know to which logical block address (hereinafter referred simply as "address") of the actual LU 222 provided by which second storage control device 200 a specific logical block address of the virtual LU 72 corresponds. The mapping table TM is registered manually or automatically, for example, when the storage system is configured and the logical volume is registered.

Here, mapping between the virtual LU and the actual LU includes a case in which the mapping table is used for every address, and a case in which some calculations are performed in addition to reference of the table for obtaining a corresponding address. In the latter case, the size of the mapping table may be reduced in comparison with the former case. In the mapping of the invention, the corresponding address can be obtained by reference to the table and calculation.

Here, it is assumed that the host device 1 issued the command CH for making data written in the virtual LU 72 in a range from the address Bb to the address Bc. The command control unit 100, upon reception of the command CH, makes reference to the mapping table TM based on the specified address. Accordingly, the command control unit 100 acknowledges that the virtual LU 72 is coordinated with the actual LU 222 which is specified by a volume ID$\alpha$2 accessible from a port 201 (port ID=TP2), and that the address Bb-Bc in the virtual LU 72 corresponds to the address Bb2-Bc2 of the actual LU 222. Then, the command control unit 100 generates a command CS by rewriting part of the contents of the command CH received from the host device 1. That is, the command control unit 100 generates the command CS by rewriting the volume ID and the address contained in the command CH received from the host device 1 into the volume ID and the address in the actual LU 222 based on the mapping table TM (Vol ID $\alpha \rightarrow$ VOl ID $\alpha$2, BLK ADDR Bb-Bc$\rightarrow$BLK ADDR Bb2-Bc2). The command control unit 100 transmits the generated command CS from the initiator port 12 via the communication network 2 to the second storage control device 200. Though it is the same in the cases shown below, when converting the address, the corresponding address can be obtained not only by making reference only to the mapping table TM, but also by performing some calculation in addition to reference of the mapping table TM.

The command CS transmitted from the first storage control device 10 is received by a target port 201 of the second storage control device 200, and taken over to a command control unit 210. The command control unit 210 analyzes the contents of the command CS and writes data into the specified address (Bb2-Bc2) in the actual LU 222 which physically exists. Upon completion of writing of data, the second storage control device 200 reports the completion of writing to the first storage control device 10. Timing of reporting the completion of writing to the host device 1 may be, for example, either one of timing when the first storage control device 10 received the command CH (asynchronous mode) and timing when the first storage control device 10 received a report of completion of writing from the second storage control device 200 (synchronous mode). In the case of synchronous mode, since there is a delay corresponding to the waiting period for a response from the second storage control device 200, it is suitable to the case in which the first storage control device 10 and the second storage control device 200 are installed not too far apart. When the first storage control device 10 is installed at a location far away from the second storage control device 200, since there are problems of response delay and propagation delay, synchronous mode is not generally suitable and thus the asynchronous mode is employed.

The same processing as the case of data writing described above is executed when the host device 1 reads data from the virtual LU 72. The command CH issued from the host device 1 (read request) is analyzed by the command control unit 100 of the first storage control device 10. The command control unit 100 generates the command CS by making reference to the mapping table TM and converting the address in the virtual LU 72 which is specified as a target of reading into the address in the actual LU 222, and then transmits the command CS to the second storage control device 200. The command CS is received by the target port 201 of the second storage control unit 200, and analyzed by the command control unit 210. The command control unit 210 reads data of the specified address from the actual LU 222 (the cache memory if it is already read out to the cache memory), and transmits read-out data to the first storage control device 10. The first storage control device 10 transmits the received data to the host device 1. When data of the address specified by the host device 1 is already stored in the cache memory 40 in the first storage control device 10, stored data may be transmitted to the host device 1.

Figure 7:
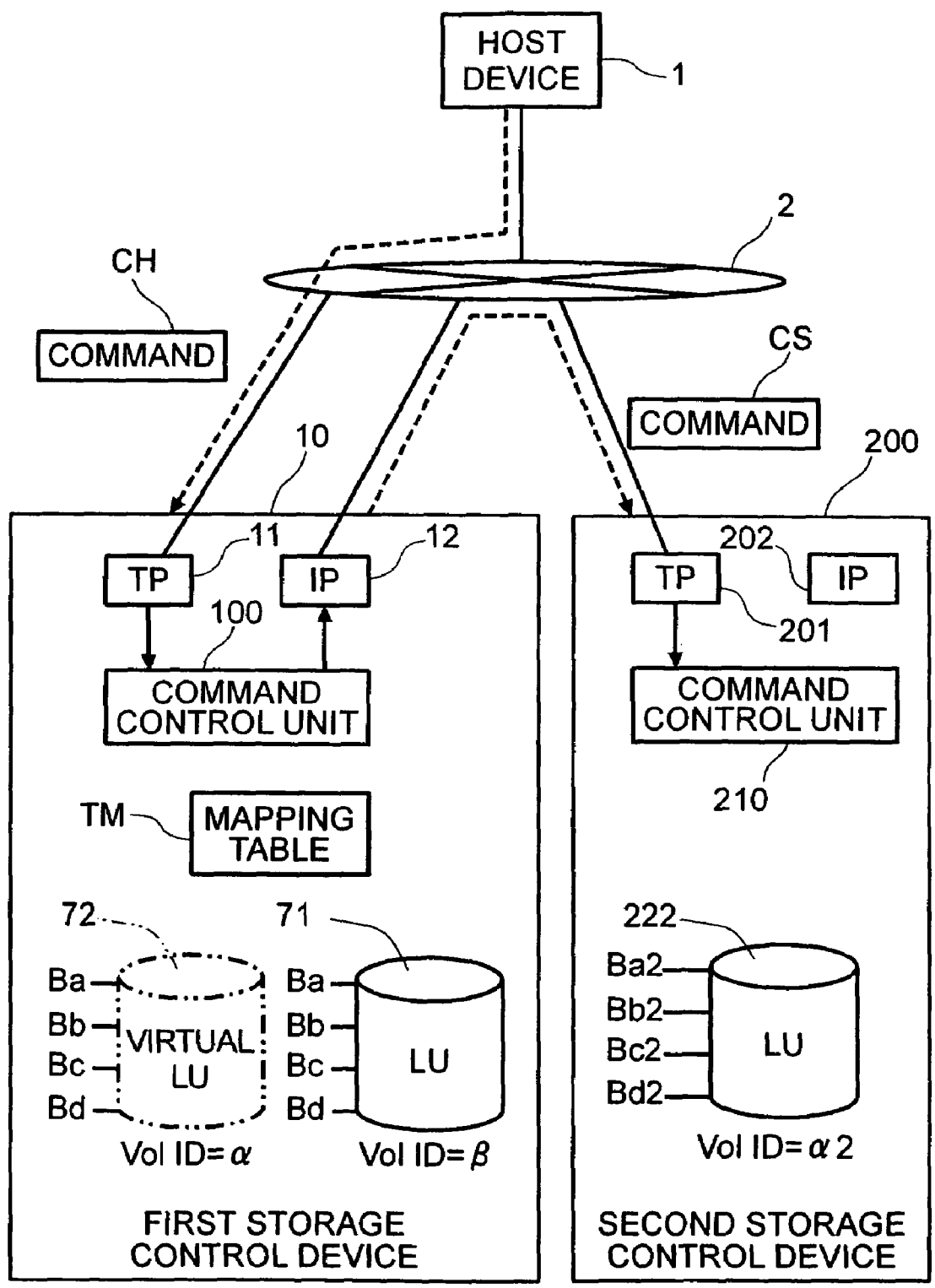
FIG. 7 is a schematic block diagram showing a case in which the first storage control device is configured as a disk array system, and is connected to a single second storage control device.

Subsequently, FIG. 7 shows a case in which the first storage control device 10 is configured as the disk array system. In this case, the first storage control device 10 includes the actual LU 71 that the first storage control device 10 controls directly by itself and the virtual LU 72. The volume ID of the virtual LU 72 is designated by a and the volume ID of the actual LU 71 is designated by β.

When the first storage control device 10 is provided with the actual LU 71 and the virtual LU 72, the mapping table TM may be configured, for example, as shown in FIG. 9B. The part of the table shown in FIG. 9B relating to the virtual LU 72 is identical to the table shown in FIG. 9A. The different point is the part relating to the actual LU 71 of the first storage control device 10. Since the actual LU 71 is possessed by the first storage control device 10, the device ID is the ID of the first storage control device 10(SD1). From the same reason, the port ID for accessing the actual LU 71 includes information indicating that it is the internal logical volume (INTERNAL) registered therein. Since there is no correspondence to the LU of the second storage control device 200, the corresponding volume ID or the address are not registered. By utilizing the identifier (internal) showing the port ID field and differentiation between internal and external, the actual LU 71 and the virtual LU 72 can be controlled by the mapping table of the identical configuration. However, it is not limited thereto, and the actual LU 71 and the virtual LU 72 may also be controlled by separate tables.

Writing and reading of data from the host device 1 to the virtual LU 72 are the same as in the case of the fiber channel switch described above, description will not be made here.

Figure 8:
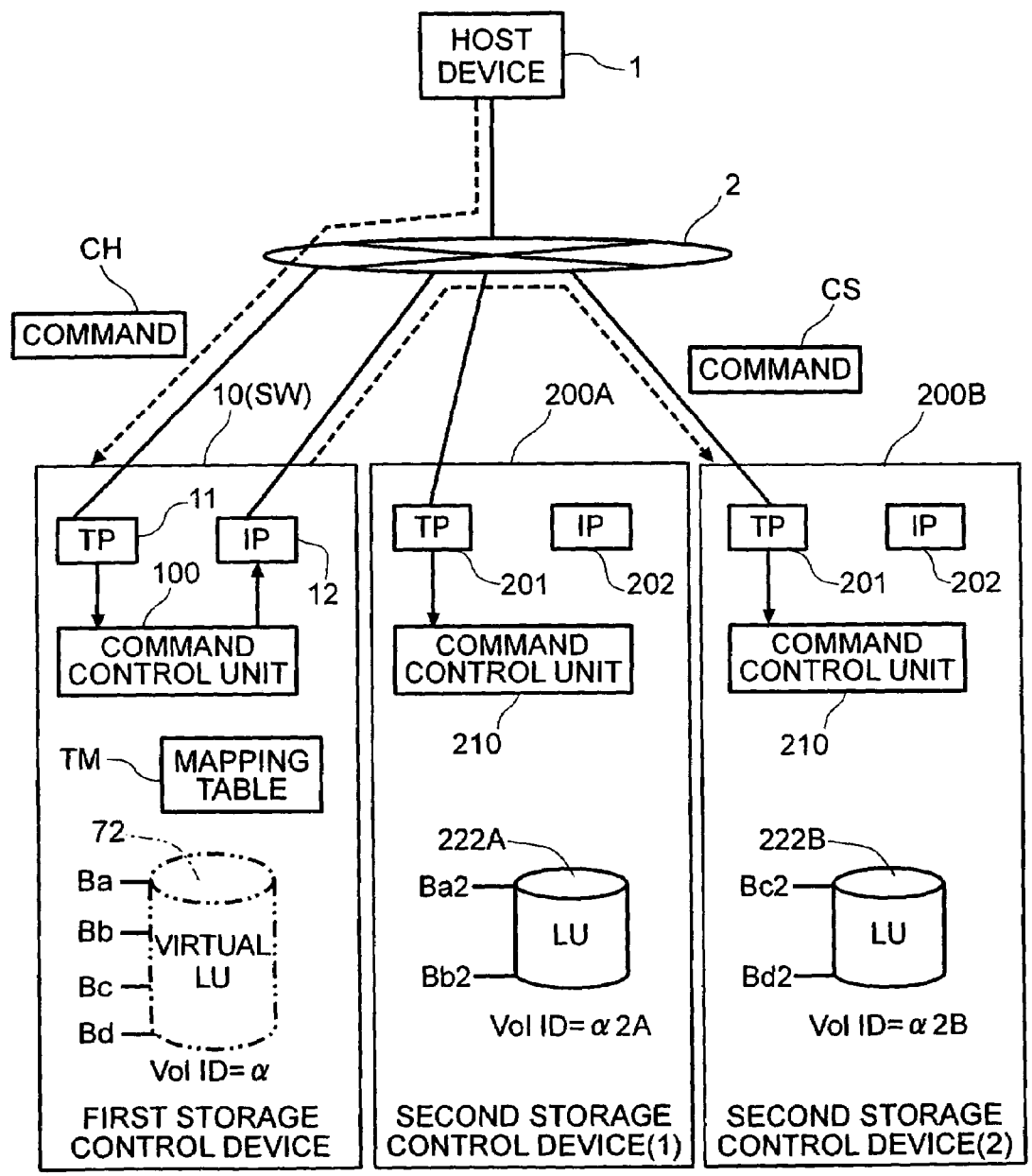
FIG. 8 is a schematic block diagram of a case in which the first storage control device is configured as a fiber channel switch and the virtual LU is configured of two actual LUs.

Subsequently, FIG. 8 shows a case in which the first storage control device 10 is configured as the intelligent fiber channel switch and the virtual LU 72 of the first storage control device 10 is configured of two logical volumes; the actual LUs 222A, 222B, which are provided respectively by the second storage control devices 200A, 200B. In this case, the mapping table TM may be configured, for example, as shown in FIG. 9C. As regards to one of the second storage control device 200A, the device ID is designated by SD2(1), the port ID is designated by TP2(1), and the volume ID is designated by α2A, and as regards to the other second storage control device 200B, the device ID is designated by SD2(2), the port ID is designated by TP2(2), and the volume ID is designated by α2B.

As shown in the mapping table TM in FIG. 9C, the virtual LU 72 (volume ID=α) provided by the first storage control device 10 to the host device 1 is configured of a LU 222A (volume ID=α2A) accessible from the port ID TP2(1) and a LU 222B (volume ID=α2B) accessible from the port ID TP2(2). In this manner, the first storage control device 10 can establish one or pluralities of virtual LUs by collecting dispersed pluralities of LUs. Therefore, the storage resources of the storage system is reorganized and utilized effectively by configuring pluralities of old types of storage control devices that are low in usability together into one or pluralities of virtual LUs.

[Direct Backup 1]

Subsequently a flow of the procedure of direct backup will be described. The direct backup is a process to backup data directly between the storage control device and the backup device without interposing a host device 1. The direct backup is one of support functions that the storage control device provides.

Figure 10:
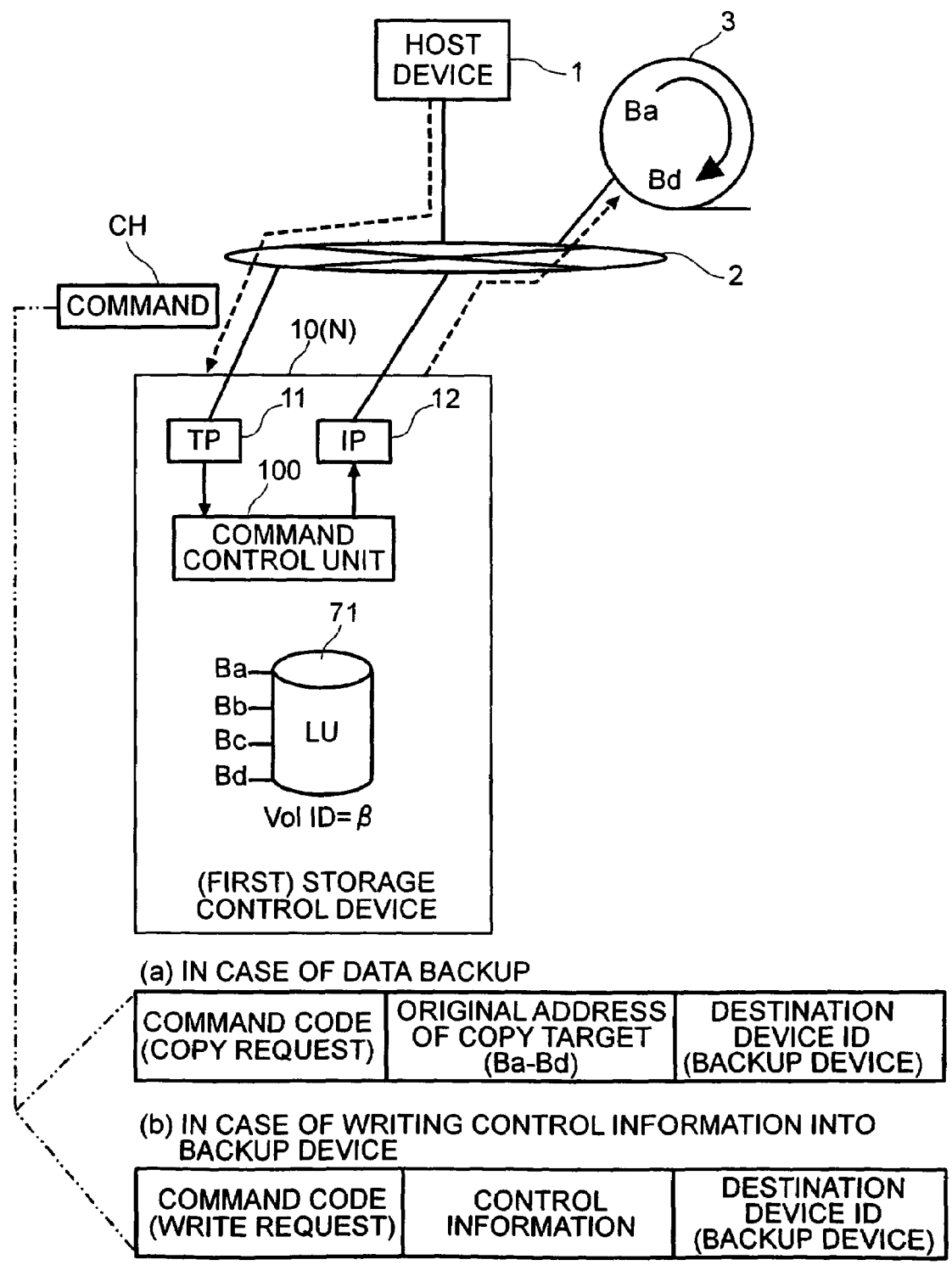
FIG. 10 is an explanatory drawing of a case in which the first storage control device executes direct backup by itself.

FIG. 10 is an explanatory drawing schematically showing the mechanism of the direct backup, which is considered to be a generally employed method. The storage control device 10 (N) shown in FIG. 10 is a normal storage control device which does not establish the virtual LU. The backup device 3 is a storage device for storing copy of the entire or part of data. The backup device 3 that can be employed includes disk type storage devices such as MO (magneto-optic), CD-R (CD-Recordable), DVD-RAM (Digital Versatile Disk-RAM), and tape-type storage device such as DAT (Digital Audio Tape) tape, cassette tape, open tape, or cartridge tape. Although the tape type storage device is assumed in an example shown in the drawing, it is not limited thereto.

In the direct backup, writing of data into the backup device can be roughly divided into two. One is data backup and the other is writing of control information. Which backup is to be performed is decided by the command (request) issued by the host device 1. In the case of data backup, a copy request as shown in FIG. 10A is transmitted from the host device 1 to the storage control device 10(N). When performing data backup, the command CH transmitted from the host device contains a request ID indicating the copy request stored in, the command code, an address and a volume ID (only the address is shown in the drawing) indicating the range of data to be backed up stored in the copy-from address, and a device ID specifying the backup device 3 stored in the copy-to device ID, respectively. On the other hand, when performing backup of control information, the command CH contains a request ID requesting writing of control information stored in the command code and an ID of the backup device 3 stored in the copy-to device ID, and the command CH contains control information which is a copy target. As an actual example of these requests, there is Extended Copy Command which is defined, for example, by SCSI-3.

First, the operation in the case of data backup will be described. The host device 1 generates the command (copy request) CH as shown in FIG. 10A, and specifies the address of the logical block which is a target of backup in the LU 71. The generated command CH is transmitted from the host device 1 via the communication network 2 to the storage control device 10(N). The storage control device 10(N) receives the command CH by the target port 11. The received command CH is analyzed by the command control unit 100, and is recognized that it is a copy request for requesting data backup. The command control unit 100 reads data in the logical block at the specified address Ba-Bd in the specified logical volume β by making reference to the address of the copy target contained in the command CH. The command control unit 100 generates a command (write request) for making the read-out data which is to be backed up to be written into the backup device, and transmits the write command from the initiator port 12 to the backup device 3. The backup device 3, which received the write command from the storage control device 10(N), writes the received data to a predetermined position, and upon completion of writing, transmits a write completion report to the storage control device 10(N).

Subsequently, the operation in the case of writing control information will be described. The host device 1 generates a control information write command as shown in FIG. 10B. The storage control device 10(N) which received the command CH from the host device 1 analyzes the command CH and comprehend the contents, and then extract control information contained in the command CH. Then, as described above, the command control unit 100 generates the write command for making the backup device 3 write extracted control information and transmits it to the backup device 3. The backup device 3 which received the write command from the storage control device 10(N) writes control information at a predetermined position and transmits a write completion report to the storage control device 10(N).

[Direct Backup 2]

Figure 11:
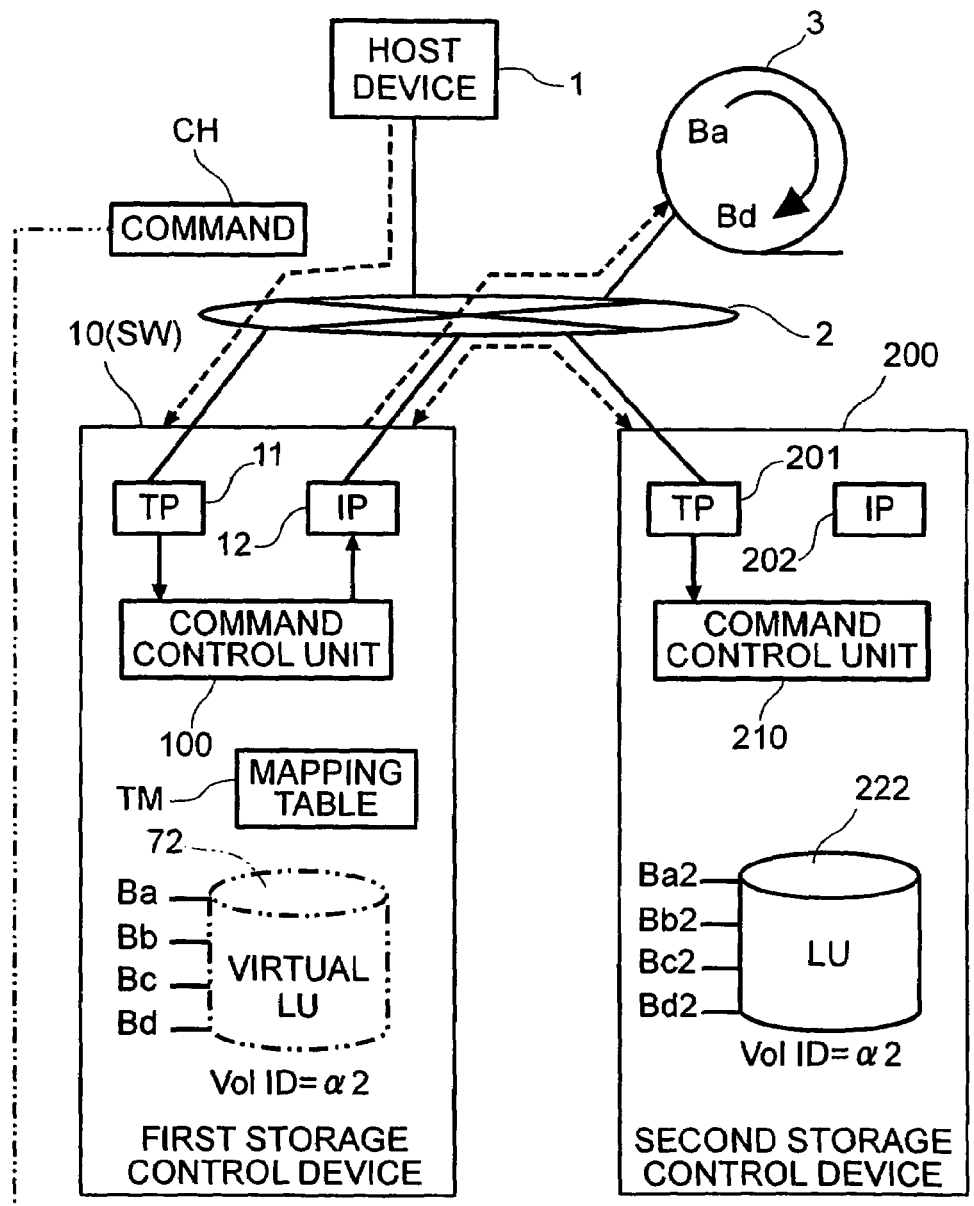
FIG. 11 is an explanatory drawing showing a case in which the first storage control device provided with a virtual LU executes direct backup.

Referring next to FIG. 11, another method of direct backup will be described. FIG. 11 shows a case in which the direct backup is executed in the configuration in which the actual storage area of the second storage control device 200 is virtually provided to the host device 1 as if it were its own storage area.

As shown in the drawing, for example, the first storage control device 10 configured of an intelligent fiber channel switch, the second storage control device 200, the host device 1, and the backup device 3 are connected with respect to each other via the communication network 2. As described above, the actual LU 222 directly controlled by the second storage control device 200 is coordinated with the virtual LU 72 of the first storage control device 10 by the mapping table TM. Accordingly, the first storage control device 10 indirectly dominates the actual LU of the second storage control device 200, and provides it to the host device 1 as the virtual LU 72.

Describing now the case of performing data backup, the host device 1 generates the command CH containing the request ID indicating the copy request, the volume ID (α) and the address (Ba-Bd) for specifying target data, and the device ID for specifying the copy-to device (the device ID of the backup device) Subsequently, when the host device 1 transmits the command CH to the first storage control device 10 via the communication network 2, the command CH is received by the target port 11 of the first storage control device 10. The command control unit 100 searches the address of the actual LU 222 corresponding to the address in the virtual LU 72, which is the copy target, by analyzing the command CH, and making reference to the copy-from address contained in the command CH and the mapping table TM. In other words, the command control unit 100 acknowledges that the logical volume corresponding to the virtual LU 72 to which direct backup is specified is the actual LU 222 accessible from the target port 201, and that the range of direct backup is the range between the addresses Ba2 to Bd2 in the actual LU 222.

Subsequently, the command control unit 100 generates a read command (read request) for reading data stored in the address Ba2 to Bd2 in the actual LU 222, and transmits the read command from the initiator port 12. The read command is received by the target port 201 of the second storage control device 200 via the communication network 2. The command control unit 210 of the second storage control device 200 reads data in the range requested by the read command from the actual LU 222 and transmits it to first storage control device 10. Accordingly, the first storage control device 10 obtains data, which is the target of direct backup, and stores data temporarily in the cache memory 40. Then, the command control unit 100 generates a write command (copy request) for making the backup device 3 write data obtained from the second storage control device 200 and transmits the write command to the backup device 3 which is specified as a copy-to device. The backup device 3 stores the received data to a predetermined position based on the write command received from the first storage control device 10.

A case of writing control information will be described. In this case, the operation is similar to direct backup which is considered to be a general approach which has been described in conjunction with FIG. 10. In other words, the host device 1 generates the command CH including the request ID indicating writing request of control information, the device ID for specifying the copy-to device, and control information to be backed up and transmits it to the first storage control device 10. The command control unit 100 analyzes the received command CH, and generates a write command giving instruction to write control information extracted from the command CH, and transmits it to the backup device 3. The backup device 3 stores control information at the predetermined position upon reception of the write command.

In this manner in the configuration virtually incorporating the actual LU 222 of the second storage control device 200 as the storage area of the first storage control device 10, the first storage control device 10 leads the operation of the storage system and executes data processing requested from the host device 1 (in the case of direct data backup). Therefore, the processing load of the first storage control device 10 increases although it depends on conditions such as the number of second storage control devices 200 which is indirectly dominated by the first storage control device 10, the contents of processing requested from the host device 1, the speed of the communication network 2. Therefore, according to the invention, as described below, the load-balancing is realized by making the second storage control device 200 execute part or entire processing that can be executed by the first storage control device 10.

[Direct Backup 3]

Figure 12:
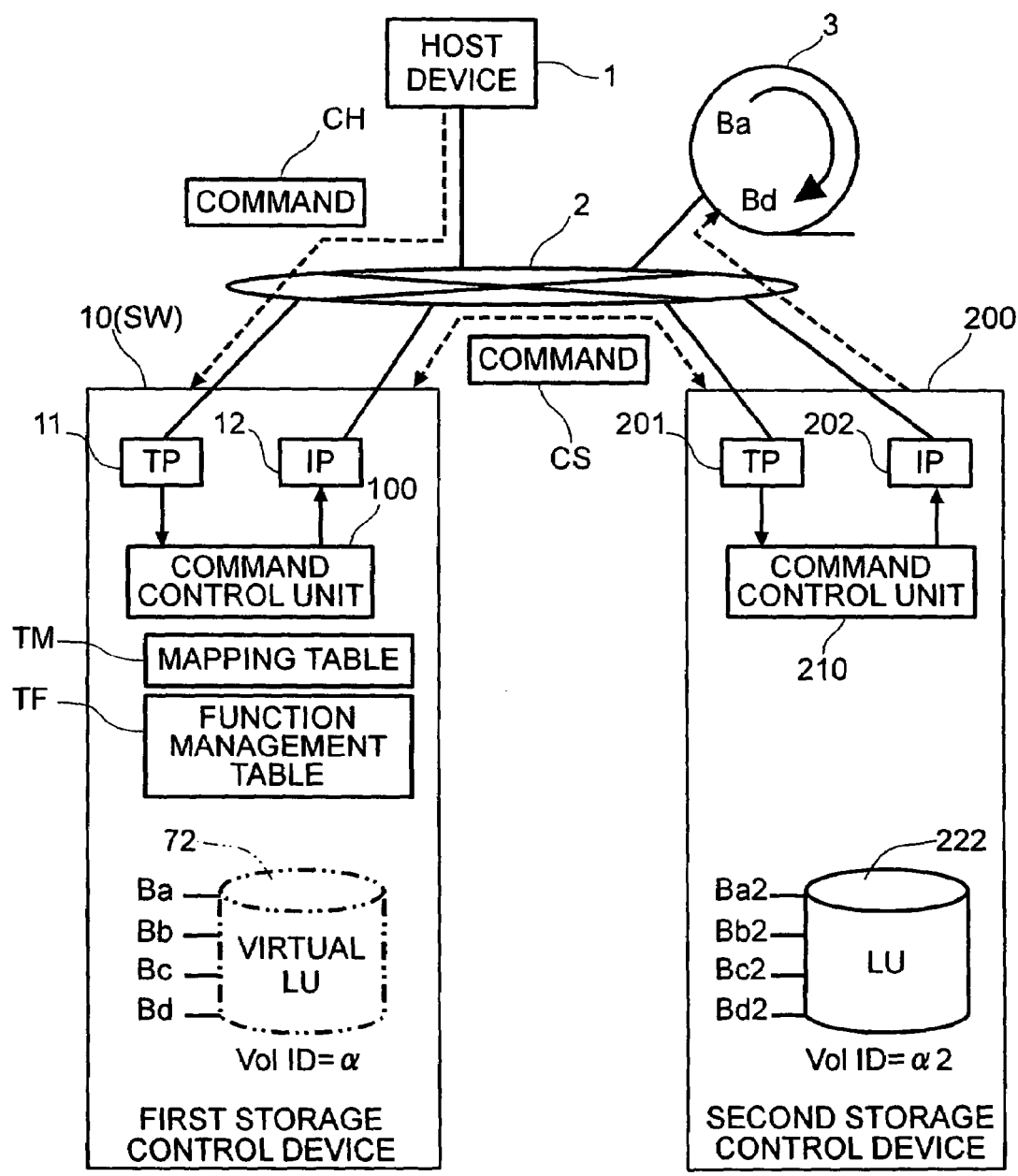
FIG. 12 is an explanatory drawing showing a case in which the first storage control device provided with a virtual LU makes the second storage control device take over direct backup.

Referring next to FIG. 12 to FIG. 14, another method of direct backup will be described. This method is characterized in that when the direct backup can be executed by the second storage control device 200, the second storage control device 200 is made to execute direct backup.

When direct data backup is desired, the host device 1 generates the command CH for direct backup. The command CH contains a request ID indicating copy request, a copy-from address of the copy target, and a device ID of the copy-to device, as described above. When the host device 1 transmits a command CH via the communication network 2, the command CH is received by the target port 11 of the first storage control device 10.

The command control unit 100 acknowledges that the copy request is received by analyzing the command CH and making reference to the command table TC (not shown) based on the request ID. The command control unit 100 makes reference to the mapping table TM based on the copy-from address specified by the command CH, and searches the address in the actual LU 222 corresponding to the address of the virtual LU 72. In other words, the command control unit 100 detects the ID (α2) of the volume corresponding to the specified virtual LU 72 and detects the address (Ba2 to Bd2) in the storage space in the actual LU 222 corresponding to the address (Ba to Bd) in the storage space in the virtual LU 72.

Subsequently, the command control unit 100 makes reference to the function management table TF, and confirms support functions that can be executed by the second storage control device 200. FIG. 13A shows an example of the function management table TF. FIG. 13A shows a case of controlling functions of the respective second storage control devices 200. In the function management table TF, for example, the device ID (SD2(1) to SD2(n)) for specifying the respective second storage control devices 200, the port ID (TP2(1) to TP2(n)) for accessing the respective actual LUs 222, and judgement information indicating whether or not the respective support functions (F1 to Fn) are executable are coordinated with each other. The executable functions are marked with "positive", and the functions which are not executable are marked with "negative". The support functions are, for example, a direct backup, copying process between a pair of volumes, mirroring, remote copying, and so on. The function management table TF is registered manually or automatically when the storage system is configured. When only a single second storage control device 200 is connected to the first storage control device 10, there is only one record in the function management table TF shown in FIG. 13A.

When the command control unit 100 makes reference to the function management table TF and confirms that the second storage control device 200 supports the direct backup function, the command control unit 100 generates the second command CS by rewriting part of the first command CH in order to make the second storage control device 200 take over the direct backup. More specifically, for example, as shown in FIG. 13B, 13C, the command CS is generated by making reference to the mapping table TM and rewriting the volume ID and the address stored in the "copy-from address" in the command CH into the volume ID of the corresponding actual LU 222 and the corresponding address respectively. In other words, the request ID indicating the type of the request and the copy-to device ID are common between both commands CH and CS, and only information for identifying target data of direct backup is converted into the address in the storage space in which that data is actually stored. Therefore both of the commands CH, CS are common in data structure except that only part of the contents differs from each other.

In this manner, the command CS generated by the command control unit 100 reaches the target port 201 of the second storage control device 200 from the initiator port 12 via the communication network 2. The command control unit 201 of the second storage control device 200 analyzes the command CS and reads out data of specified range from the actual LU 222. Then, the command control unit 210 generates a write command giving instruction to write read-out data to the backup device 3, and transmits it to the backup device 3. The backup device 3 stores the received data to a predetermined position upon reception of write command from the second storage control device 200.

Referring to FIG. 14, the operation of the first storage control device 10 will be described. When the first storage control device 10 receives the command CH from the host device 1 (S1), the command control unit 100 analyzes the command CH (S2), and makes reference to the function management table TF (S3). Then, when it is judged that the second storage control device 200 can execute direct backup of data (YES in S4), the command control unit 100 generates the command CS for making the second storage control device 200 take over direct backup of data (S5), and transmits the command CS to the second storage control device 200 (S6). When the second storage control device 200 does not support the direct backup function (NO in S4), the command control unit 100 read data to be backed up from the actual LU 222 of the second storage control device 200 (S7). The command control unit 100 stores read-out data into the backup device 3 by generating a write command and transmits it to the backup device 3 (S8).

When writing control information, it is done in a method which is considered to be a general method described above. In other words, the command control unit 100 extracts control information from the received command CH, generates a write command for writing extracted control information into the backup device 3 and transmits it to the backup device 3.

As described above in detail, according to the embodiment, whether or not the data processing (direct backup) requested from the host device 1 can be executed by the second storage control device 200 is judged and, when it is judged that the second storage control device 200 can execute, the second storage control device 200 is made to execute the requested data processing. Therefore, since concentration of processing on the first storage control devices 10 is prevented and the load can be dispersed, the processing load of the first storage control devices 10 can be alleviated. Accordingly, the information processing resources of the first storage control devices 10 can be provided to the host device 1 for realizing other services, which contributes to effective utilization of the entire storage system.

[Embodiment 2]

[Logical Volume Copying 1]

Figure 15:
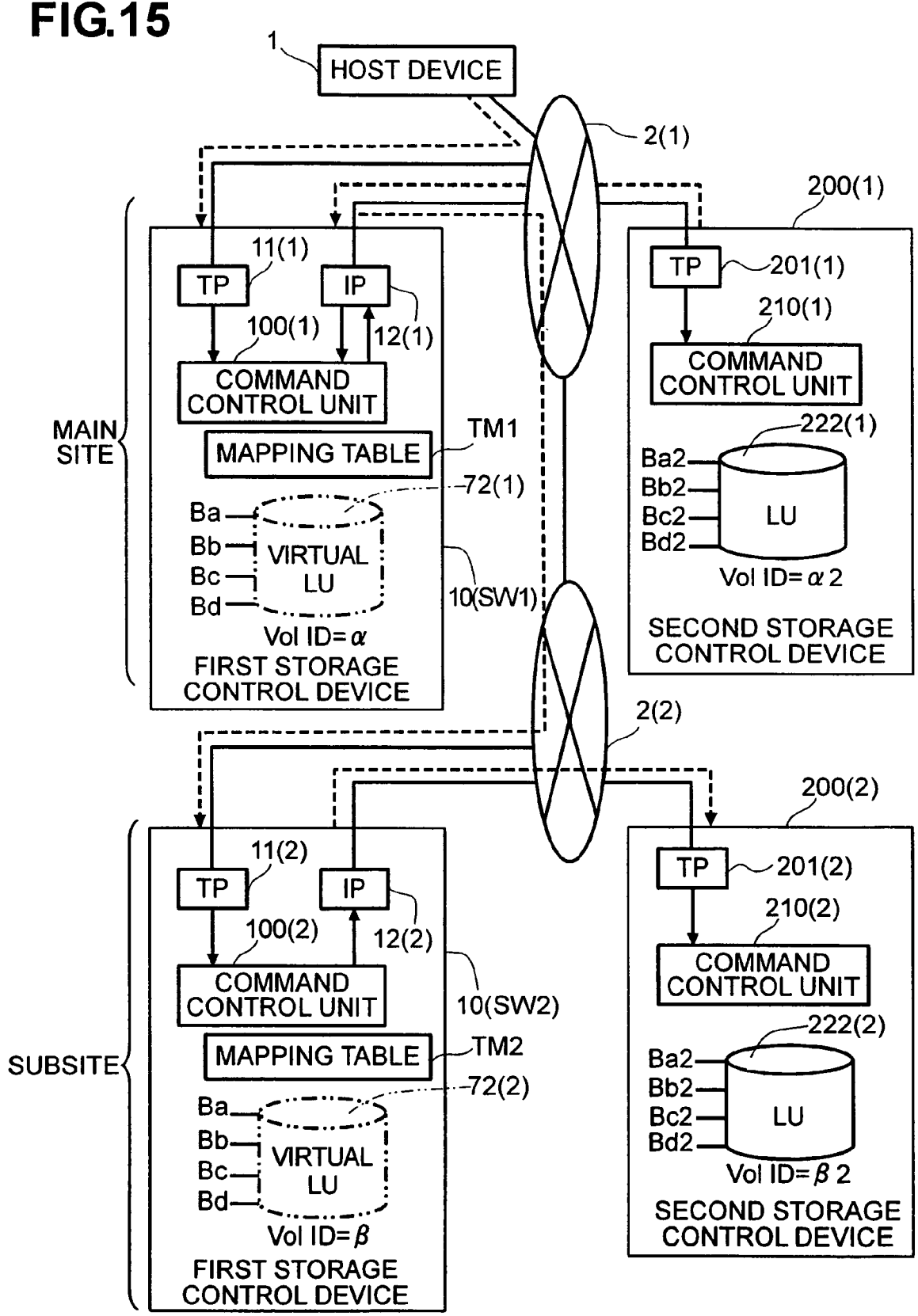
FIG. 15 is a schematic block diagram showing the entire storage system according to the second embodiment of the invention.

Referring next to FIG. 15, the copying process of the logical volume will be described. In the logical volume copying of the embodiment, the contents of the logical volume are copied between the main site (primary site) and the subsite (secondary site) installed at locations away from each other.

The main site includes the host device 1, the first storage control device 10(SW1) configured of the intelligent fiber channel switch, and the second storage control device 200 (1), which are connected to each other so as to be capable of communicating via the communication network 2(1). The subsite includes the first storage control device 10(SW2) configured of the intelligent fiber channel switch and the second storage control device 200(2), which are connected to each other so as to be capable of communicating via the communication network 2(2) The communication network 2(1) of the main site and the communication network 2(2) of the subsite are also connected to each other. Hereinafter, in order to clarify in which one of the main and sub sites the member is installed, reference numeral (1) which represents the primary side and reference numeral (2) which represents the secondary side are added, and when it is not necessary to differentiate between them these additional numerals are omitted.

The logical volume copying of the embodiment means to determine a pair of the logical volume (α) in the main site, which is the copy-from volume, and the logical volume (β) in the subsite, which is the copy-to volume (volume pair) and copy the stored contents in the logical volume (α) in the main site to the logical volume (β) in the subsite, and can be classified into two types. One of them is an initial copy in which all data in the logical volume (α), which is the copy-from volume, is transmitted to and written in the logical volume (β) in the subsite, which is the copy-to volume.

Another one is a renewal copy in which only part of data in the logical volume (α) in the main site renewed by the host device 1 is transmitted to and written in the logical volume (β) in the subsite after completion of the initial copy.

The initial copy is a processing to transfer the stored contents in all the logical blocks possessed by the copy-from logical volume to the copy-to logical volume, and exerts a large processing load to the storage control device that executes the initial copy. Therefore, in the embodiment, means for preventing the first storage control device from being overloaded during initial copy will be described.

In the prerequisite structure shown in the drawing, the case in which the first storage control device 10(SW1) in the main site executes copying of logical volume will first be described.

The first storage control devices 10(SW1), 10(SW2) are respectively provided with mapping tables TM1, TM2 for loading the logical volumes of the corresponding second storage control devices 200(1), 200(2). For example, the first storage control device 10(SW1) installed in the main site is provided with the mapping table TM1 as shown in FIG. 16A. The first storage control device 10(SW2) installed in the subsite, for example, is provided with the mapping table TM2 as shown in FIG. 16B. Any of mapping tables includes the access port ID, volume ID, and address to the actual LUs 222(1), 222(2) of the corresponding second storage control devices 200(1), 200(2) as described above.

When performing initial copy, the host device 1 generates a command (initial copy start request) for example as shown in FIG. 16C. This command contains a request ID for requesting start of initial copy, a device ID for specifying the copy-from device, a volume ID for specifying the copy-from logical volume, a device ID for specifying the copy-to device, and a volume ID for specifying the copy-to logical volume. Here, the copy-from logical volume is the volume (α) of the virtual LU 72(1) possessed by the first storage control device 10(SW1) in the main site, and the copy-to logical volume is the volume (β) of the virtual LU 72(2) possessed by the first storage control device 10(SW2) of the subsite.

Figure 17:
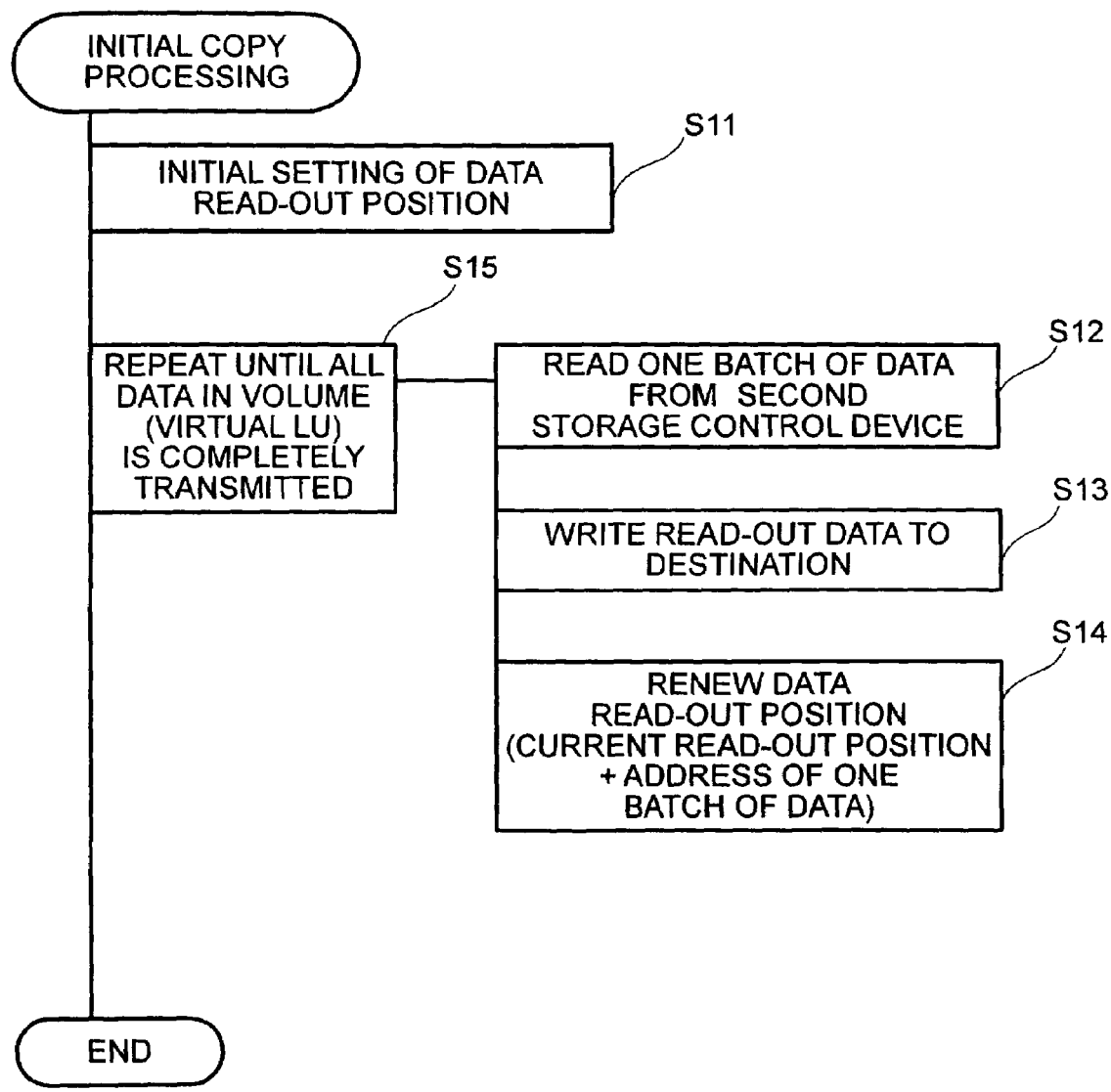
FIG. 17 is a flowchart schematically showing a procedure in the first storage control device when performing initial copy.
Figure 18:
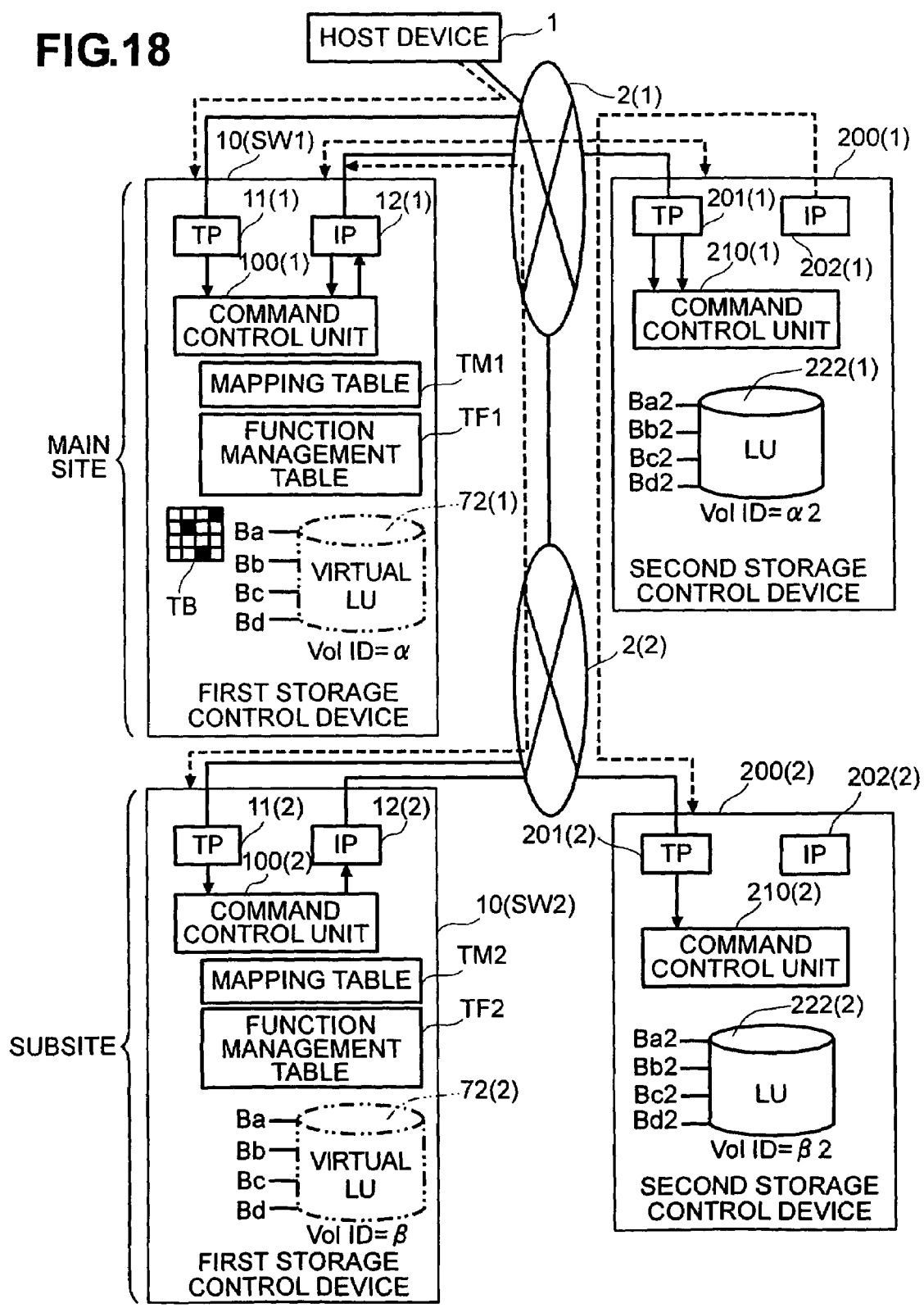
FIG. 18 is a block diagram schematically showing the entire storage system in a case in which the first storage control device provided with a virtual LU makes the second storage control device take over logical volume copy.

Referring now to FIG. 17, a flow of the processing will be described. A flowchart in FIG. 17 shows schematically a processing executed by the command control unit 100(1) of the first storage control device 10(SW1) in the main site. When the host device 1 transmits a command shown in FIG. 16C to the first storage control device 10(SW1) in the main site, the command control unit 100(1) analyzes the received command, and performs initial setting of the data read-out position (S11). In other words, the command control unit 100(1) identifies a virtual LU 72(1) (volume ID=α) provided by the first storage control device 10(SW1) in the main site based on the copy-from device ID and the copy-from volume ID in the command received from the host device 1 and initializes the first logical block address of the virtual LU 72(1) as a data read-out position.

Subsequently, the command control unit 100(1) reads out data of an amount determined as the amount of a batch of transmitting data from the initialized data read-out position (S12). The command control unit 100(1) here searches an actual LU 222(1) allocated to the virtual LU 72(1) and reads out batch of data from the actual LU 222(1) by making reference to the mapping table TM1.

Then, the command control unit 100(1) transmits data which is already read out to the copy-to device specified by the host device 1, that is, toward the virtual LU 72(2) (volume ID=β) of the first storage control device 10(SW2) installed in the subsite and the data is written therein. That is, the command control unit 100(1) requests data writing to the first storage control devices 10(SW2) in the subsite by a normal write command. The volume ID specified by this write command is β, and the write address is the first logical block address.

The write command transmitted from the initiator port 12(1) of the first storage control device 10(SW1) in the main site reaches the subsite through the communication networks 2(1), 2(2) and is received by the target port 11 (2) of the first storage control device 10(SW2) in the subsite.

The command control unit 100 (2) of the first storage control device 10(SW2) analyzes the write command, makes reference to the mapping table TM2, and searches a real LU 222(2) (volume ID=β2) corresponding to the virtual LU 72(2) (volume ID=β). The command control unit 100 (2) generates a data write command and transmits the write command from the initiator port 12(2) to the second storage control device 200(2) for making received data to be written in the actual LU 222(2) (S13). When the second storage control device 200(2) receives the write command via the target port 201(2), the command control unit 210(2) stores the received data to the first logical block address of the actual LU 222(2). When writing process is completed, the second storage control device 200(2) transmits a write completion report to the first storage control device 10(SW1). The first storage control device 10(SW2) in the sub site transmits a write completion report to the first storage control device 10(SW1) in the main site. The timing of write completion report may be synchronous mode or asynchronous mode depending on the case.

When writing process for a batch is completed, the command control unit 100(1) of the first storage control device 10(SW1) advances the position from the previous reading position by the amount corresponding to the amount of a batch of data and renews the data read position (S14). By repeating the procedures from S12 to S14 described above until it goes beyond the last logical block address of the copy-from logical volume to be copied, the initial copy between the pair of volumes is completed.

In this manner, in the initial copy between the pair of volumes in the main and sub sites, the leading first storage control device 10(SW1) has to repeat the procedures from S12 to S14 many times, which is a great burden. Therefore, an improved method is presented to reduce the load of the first storage control device 10 below.

[Logical Volume Copy 2]

Based on FIG. 18 to FIG. 21, a case in which the initial copy between a pair of volumes while reducing the load of first storage control device 10 will be described.

Likewise, the first storage control devices 10(SW1), 10(SW2) in both of the main and sub sites are provided with mapping tables TM1, TM2 as shown in FIGS. 19A, 19B respectively for utilizing actual LUs 222(1), 222(2) of the corresponding second storage control devices 200(1), 200(2) as its own virtual LUs 72(1), 72(2). These mapping tables TM1, TM2 are registered when the storage system is configured. The first storage control devices 10(SW1), 10(SW2) in both of the main and sub sites are provided respectively with function management tables TF1, TF2 which controls a list of the functions which the corresponding second storage control devices 200(1), 200(2) support, as shown in FIGS. 19C, 19D. In other words, in each of the main and sub sites, the first storage control devices 10(SW1), 10(SW2) indirectly dominate actual LUs 222(1), 222(2) of the second storage control devices 200(1), 200(2), and comprehends the support functions possessed by the second storage control devices 200(1), 200(2).

Figure 20:
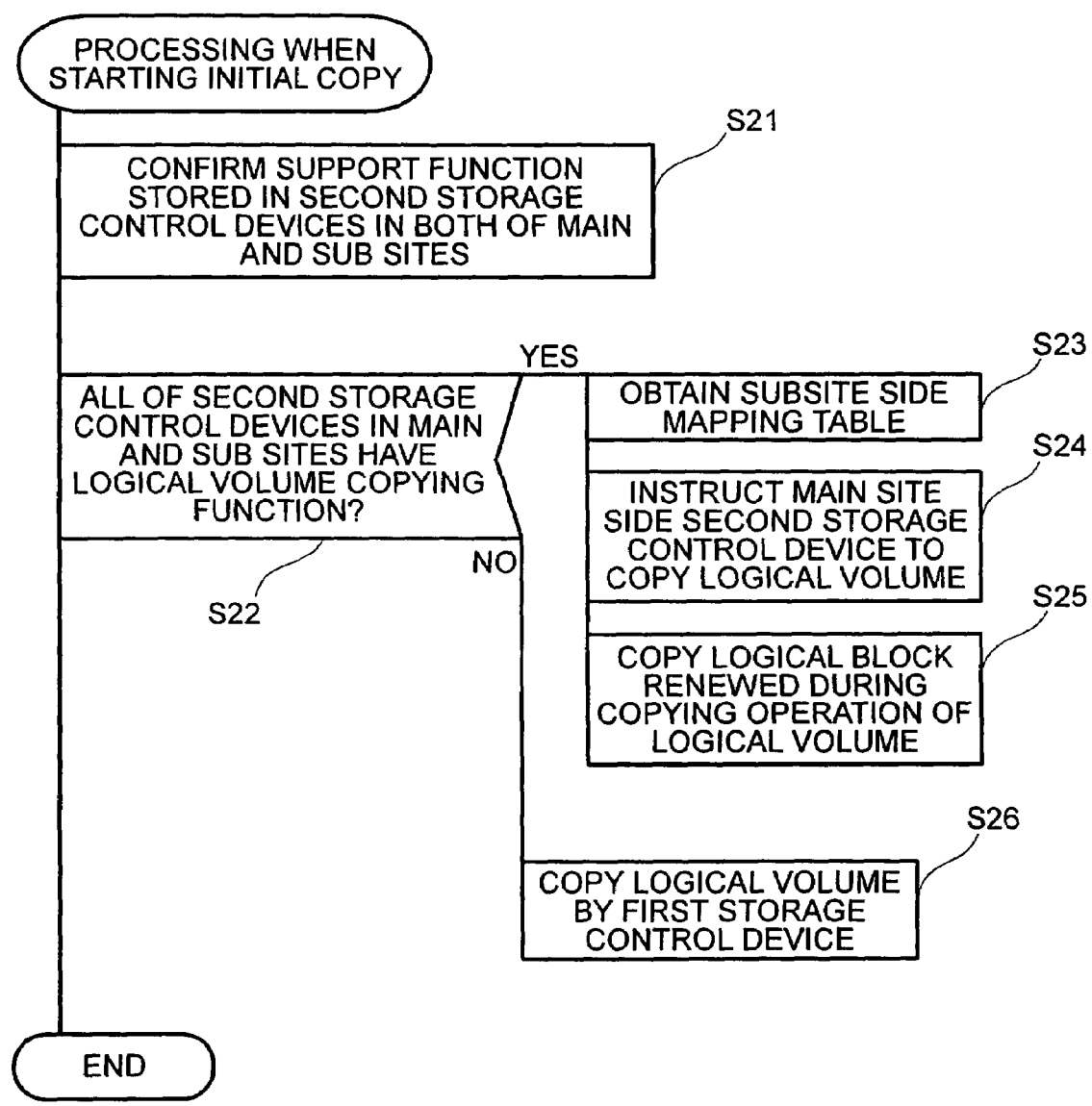
FIG. 20 is a flowchart schematically showing a processing of initial copy executed by the first storage control device.

Likewise, the host device 1 generates an initial copy start command having a structure shown in FIG. 19E, and transmits it to the first storage control device 10(SW1) in the main site via the communication network 2(1). When the initial copy start command is received by the first storage control device 10(SW1) via the target port 11(1), the command control, unit 100(1) analyzes the received command and starts the initial copy. A flow of subsequent operation will be described referring also to FIG. 20. FIG. 20 schematically shows a procedure to be executed by the command control unit 100(1) which received the initial copy start command.

The command control unit 100(1) first confirms functions that the second storage control devices 200(1), 200(2) installed in both of the main and sub sites support (S21). The command control unit 100(1) makes reference to the function management table TF1 shown in FIG. 19C, and confirms whether or not the second storage control device 200(1) in the main site supports the logical volume copying function. For example, assuming that the function F1 is a logical volume copying function, since it is set to "positive", the command control unit 100(1) acknowledges that it is possible to make the second storage control device 200(1) in the main site take over the logical volume copying process.

Subsequently, the command control unit 100(1) transmits a command (table acquisition request) requesting acquisition of the function management table TF2 via the communication networks 2(1), 2(2) from the initiator port 12(1) to the first storage control device 10(SW2) in the subsite. The acquisition command is supplied to the command control unit 100(2) via the target port 11 (2). The command control unit 100(2) returns the contents of the function management table TF2 shown in FIG. 19D to the main site side as a response to the acquisition command. The command control unit 100(1) in the main site comprehends that the second storage control device 200(2) in the subsite has the logical volume copying function based on the contents of the function management table TF2 acquired from the subsite. The contents of the acquired function management table TF2 is stored in a shared memory or in the cache memory in the first storage control device 10(SW1). In addition to the case in which all the content in the function management table TF2 are transmitted from the subsite to the main site, it is also possible, for example, to configure the command control unit 100(1) in the main site to send an inquiry to the command control unit 100(2) in the subsite asking whether or not the second storage control device 200(2) supports a specific function.

In this manner, the command control unit 100(1) confirms whether or not each of the second storage control devices 200(1) 200(2) installed in both of the main site and the subsite have the logical volume copying function and, when both of them have the logical volume copying function (YES in S22), the direct logical volume copying process is started by the second storage control devices 200(1), 200(2).

The command control unit 100(1) requests acquisition of a mapping table TM2 to the first storage control device 10(SW2) in the subsite so as to acquire information on the actual LU 222(2) corresponding to the virtual LU 72(2) in the subsite which is specified as the copy-to volume from the host device 1 (S23). The table acquisition request is performed in the same manner as the case of the function management table TF2, the description will be omitted.

Subsequently, the command control 100(1) transmits an initial copy start command from the initiator port 12(1) via the communication network 2(1) to the target port 201(1) of the second storage control device 200(1) (S24). In this case, the command control unit 100(1) transmits information on the copy-from logical volume to be copied (α) extracted from the mapping table TM 1 in the main site together with information on the copy-to logical volume (β) extracted from the mapping table TM2 in the subsite to the second storage control device 200(1) in the main site. When the host device 1 renewed the contents of the virtual LU 72(1) by the host device 1 while the second storage control device 200(1) is performing initial copy, information on the renewed logical block is stored in a differential bitmap table TB.

Figure 21:
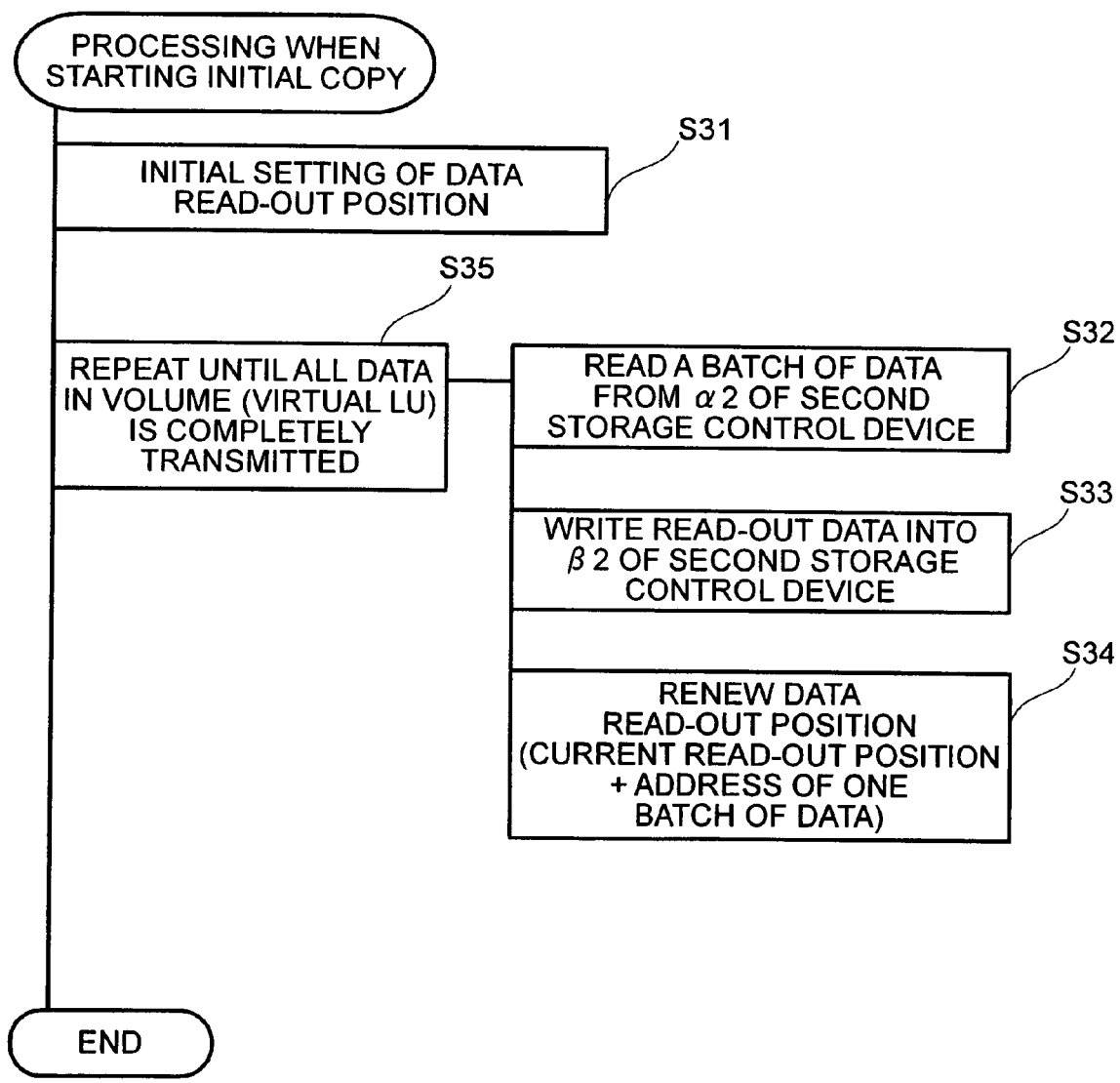
FIG. 21 is a flowchart showing a second storage control device performing initial copy requested from the first storage control device.

When the second storage control device 200(1) in the main site receives the initial copy start command via the target port 201(1), the command is analyzed by the command control unit 210(1), and the initial copy shown in FIG. 21 starts.

FIG. 21 shows an initial copy executed by the command control unit 210(1) of the second storage control device 200(1) in the main site. The command control unit 210(1) initializes the first logical block address of the copy-from virtual LU 72(1) (volume ID=α) based on copy-from volume ID specified by the initial copy start command and information on each logical volume to be copied obtained in S24 as a data read-out position (S31).

Subsequently, the command control unit 210(1) reads data by an amount, which is preset as a batch of transmitting data, from the preset data read-out position (S32). At this time, the command control unit 210(1) searches the real LU 222(1) corresponding to the virtual LU 72(1) based on information in the mapping table TM1 which has been acquired from the first storage control device 10(SW1), and a batch of transmitting data is read out from the first logical block address of the actual LU 222(1) (volume ID=α2).

The command control 210(1) then transmits the read-out data to, and stores the same at, the copy-to destination specified by the first copy start command (S33). This write request is performed by the normal write command. The command control unit 210(1) at this time sets the destination in the write command to the actual LU 222(2) (volume ID=β2) corresponding to the virtual LU 72(2) in the subsite based on information in the mapping table TM2 acquired from the first storage control device 10(SW1). The copy-to address is the same as the address specified when reading data from the actual LU 222(1).

The write command transmitted from the initiator port 202 (1) of the second storage control device 200(1) is received by the target port 201(2) of the second storage control device 200(2) in the subsite via the communication network 2(1), 2(2). The command control unit 210(2) of the second storage control device 200(2) writes received data at a predetermined position in the actual LU 222(2) according to the received write command and reports write completion to the second storage control device 200(1) in the main site.

When processing of one write command is completed, the command control unit 210(1) renews the data read position by advancing the position from the previous read-out position by the amount corresponding to a batch of transmit data (S34). The command control unit 210(1) repeats the procedures from S32 to S34 until the contents stored in the actual LU 222(1) is transferred to the actual LU 222(2) completely (S35). When the initial copy is completed, the command control unit 210(1) reports completion of initial copy to the first storage control device 10(SW1).

When the initial copy is completed, the procedure returns to FIG. 20, where the command control unit 100(1) of the first storage control device 10(SW1) makes reference to the differential bitmap table TB. The differential bitmap table TB contains information on new data written by the host device 1 into the virtual LU 72(1), which is the original copy-from target, during initial copy, that is, address information of the renewed logical block.

When the fact that the contents stored in the virtual LU 72(1) has changed during initial copy is detected by referring the differential bitmap table TB, the command control unit 100(1) executes a procedure to write all the logical blocks shown in the differential bitmap table TB into the copy-to virtual LU 72(2) (S25). The copy of this renewed data can be performed, for example, according to the method described in [Logical volume copy 1].

The reason why the process of writing new data written during initial copy to the subsite is performed is as follows. The command control unit 210(1) in the second storage control device 200(1) performs initial copy according to the logical block address in the ascending order. For example, when new data is written in the vicinity of the first logical block address of the logical volume at the timing when the initial copy is about to be completed, the command control unit 210(1) cannot copy this data on the side of the subsite. In order to avoid uncopied logical block, copying of newly written data based on the differential bitmap table TB is performed.

In FIG. 20, one of the second storage control devices 200(1), 200(2) in the main and sub sites is judged not to support the logical volume copy function (NO in S22), as described in [Logical volume copy 1], initial copy is executed in the initiative of the first storage control device 10 (SW1) in the main site (S26).

According to the embodiment thus configured, as in the case of the previous embodiment, the data processing (logical volume copy between the main site and the subsite) requested by the host device can be committed to the second storage control devices 200(1), 200(2), and the load of data processing can be dispersed to reduce the load of the first storage control devices 10(SW1), 10(SW2). Therefore, information processing capacity of the first storage control device 10(SW1) can be utilized for realizing other services, and hence the storage system can be effectively operated.

[Embodiment 3]

Figure 22:
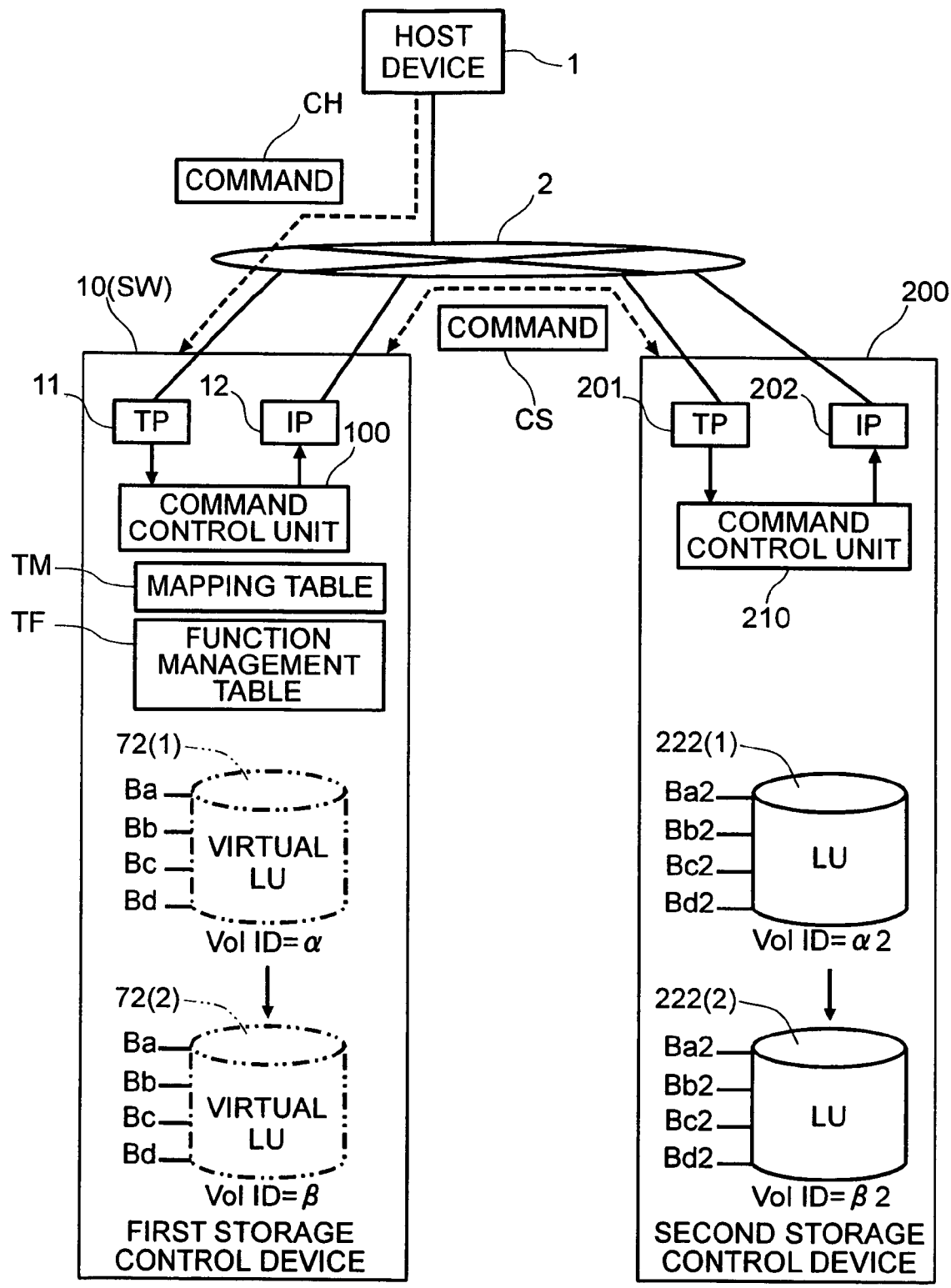
FIG. 22 is a block diagram schematically showing the configuration according to the third embodiment of the invention, in which synchronization of the internal volume is performed.

Referring next to FIG. 22, a third embodiment of the invention will be described. The embodiment is characterized in that the first storage control device 10 includes a plurality of virtual LUs 72(1), 72(2) and applied to the case where the storage contents in the plurality of virtual LUs 72(1), 72(2) are synchronized (mirroring).

The first storage control device 10 is configured of an intelligent fiber channel switch, and includes two virtual LUs 72(1), 72(2). One virtual LU 72(1) is a primary volume, and the other virtual LU 72(2) is a secondary volume. The substances of the virtual LUs 72(1), 72(2) exist in the actual LUs 222(1), 222(2) of the second storage control device 200, respectively.

When copying the contents stored in the virtual LU 72(1), the same methods described in [Logical volume copy 1] or [Logical volume copy 2] in the second embodiment may be employed.

For example, according to one method, the first storage control device 10 can copy all data in the actual LU 222(1) to the actual LU 222(2) by reading data in the actual LU 222(1) in the second storage control device 200 from the first logical block address by a predetermined amount and writing the read-out data in the actual LU 222(2) of the second storage control device 200 at a predetermined position.

According to another method, whether or not the second storage control device 200 supports the mirroring function is judged and, when it supports the mirroring function, the first storage control device 10 transmits a mirroring start command to the second storage control device 200. The mirroring start command at least contains an copy-from volume ID (α) and the copy-to volume ID (β). In this case, the contents stored in the mapping table TM can be transmitted together. Alternatively, it is also possible to convert the copy-from volume ID into α2, and the copy-to volume ID into β2 respectively by making reference to the mapping table TM and transmit the mirroring start command.

Upon reception of the mirroring start command, the second storage control device 200 copies all data from the first logical block address to the last logical block address in the actual LU 222(1) to the actual LU 222(2) by a predetermined amount. When data is renewed by the host device 1, as described above, it is possible to copy the renewed data afterwards using the differential bitmap table.

The invention is not limited to the embodiments described above. Various additions or modifications may be made by those skilled in the art without departing from the scope of the invention. Although the intelligent fiber channel switch has been mainly described in the embodiments described above, the invention is not limited to, and may widely be applied also to the disk array system and the like. It is also possible to apply the invention to the case in which virtual storage areas corresponding to the actual storage areas of the different second storage control devices are provided in the first storage control devices.

What is claimed is:

1. A virtualization system, comprising:
   a first virtualization device having a first virtual volume related to a first logical volume of a first storage system, said first storage system having a first storage controller, a plurality of first disk drives and said first logical volume related to at least one of said first disk drives; and
   a second virtualization device having a second virtual volume related to a second logical volume of a second storage system, said second storage system having a second storage controller, a plurality of second disk drives and said second logical volume related to at least one of said second disk drives, wherein
   the first and second virtualization devices are configured to copy data between the first and second virtual volumes, the first and second virtualization devices being configured to selectively control a plurality of data copy processes between the first virtual volume and the second virtual volume, the data copy processes including a first copy process copying data between the first and second storage systems without being via the first and second virtualization devices, and a second copy process copying data between the first and second storage systems via the first and second virtualization devices.

2. A virtualization system according to claim 1, wherein the first and second virtualization devices are configured to copy data between the first and second virtual volumes by using data being copied between the first and second storage systems.

3. A virtualization system according to claim 1, wherein the first virtualization device is configured to receive data of the first logical volume related to the first virtual volume and to send the received data to the second virtualization device, and
   the second virtualization device is configured to receive the data sent from said first virtualization device and to send the received data to the second logical volume related to the second virtual volume so that the first and second virtualization devices effect copying of data between the first and second virtual volumes.

4. A virtualization system according to claim 1, wherein the first and second virtualization devices are configured to send one or more commands to the first and/or second storage systems, and the first and second storage systems are configured to copy data between the first and second logical volumes based on the one or more commands.

5. A virtualization system according to claim 1, wherein the first and second virtualization devices are configured to send a command to the first storage system, and the first storage system is configured to copy data from the first logical volume to the second logical volume based on the command.

6. A virtualization system according to claim 1, wherein the first and second virtualization devices are configured to store information whether the first and/or second storage system has a data copy function or not, such that if the first and/or second storage system has the data copy function, the first and second virtualization devices are configured to effect copying of data between the first and second storage systems.

7. A virtualization system according to claim 1, wherein the first virtualization device is configured to store information whether the first storage system has a data copy function or not, such that if the first storage system has the data copy function, the first virtualization device is configured to effect copying of data from the first storage system to the second storage system.

8. A virtualization system according to claim 1, wherein the first and second virtualization devices are configured to check information whether the first and/or second storage systems have a data copy function or not, such that if the first and/or second storage system has the data copy function, the first and second virtualization devices are configured to effect copying of data between the first and second storage systems.

9. A virtualization system according to claim 1, wherein the first virtualization device is configured to check information whether the first storage system has a data copy function or not, such that if the first storage system has the data copy function, the first virtualization device is configured to effect copying of data from the first storage system to the second storage system.

10. A virtualization system according to claim 1, wherein the first and second virtualization devices being configured to selectively control the plurality of data copy processes is determined based on whether the first storage system has a function of data copy or not.

11. A virtualization method, comprising the steps of:
providing a first virtualization device having a first virtual volume related to a first logical volume of a first storage system, said first storage system having a first storage controller, a plurality of first disk drives and said first logical volume related to at least one of said first disk drives;
providing a second virtualization device having a second virtual volume related to a second logical volume of a second storage system, said second storage system having a second storage controller, a plurality of second disk drives and said second logical volume related to at least one of said second disk drives; and
copying data between the first and second virtualization devices so as to effect copying of data between the first and second virtual volumes, wherein said copying of data includes selectively controlling via the first and second virtualization devices a plurality of data copy processes between the first virtual volume and the second virtual volume, the data copy processes including a first copy process copying data between the first and second storage systems without being via the first and second virtualization devices, and a second copy process copying data between the first and second storage systems via the first and second virtualization devices.

12. A virtualization method according to claim 11, wherein said step of operating the first and second virtualization devices so as to copy data between the first and second virtual volumes includes using data being copied between the first and second storage systems.

13. A virtualization method according to claim 11, further comprising the steps of:
receiving at the first virtualization device data of the first logical volume related to the first virtual volume;
sending the received data to the second virtualization device,
receiving at the second virtualization device the data sent from said first virtualization device; and
sending the received data to the second logical volume related to the second virtual volume so that the first and second virtualization devices effect copying of data between the first and second virtual volumes.

14. A virtualization method according to claim 11, further comprising the steps of:
sending from the first and/or second virtualization devices one or more commands to the first and/or second storage systems; and
copying data between the first and second logical volumes based on the one or more commands.

15. A virtualization method according to claim 11, further comprising the steps of:
sending from the first and/or second virtualization devices a command to the first storage system, and
copying data from the first logical volume to the second logical volume based on the command.

16. A virtualization method according to claim 11, further comprising the steps of:
storing in the first and second virtualization devices information whether the first and/or second storage systems has a data copy function or not; and
if the first and/or second storage system has the data copy function, copying data between the first and second storage systems.

17. A virtualization method according to claim 11, further comprising the steps of:
storing in the first virtualization device information whether the first storage system has a data copy function or not; and
if the first storage system has the data copy function, copying data from the first storage system to the second storage system.

18. A virtualization method according to claim 11, further comprising the steps of:
checking via the first and second virtualization devices information whether the first and/or second storage systems have a data copy function or not; and
if the first and/or second storage system has the data copy function, copying of data between the first and second storage systems.

19. A virtualization method according to claim 11, further comprising the steps of:
checking via the first virtualization device information whether the first storage system has a data copy function or not; and
if the first storage system has the data copy function, copying data from the first storage system to the second storage system.

20. A virtualization method according to claim 11, wherein said selective controlling of the plurality of data copy processes is determined based on whether the first storage system has a function of data copy or not.

21. A virtualization method for a system comprising a first virtualization device having a first virtual volume related to a first logical volume of a first storage system, said first storage system having a first storage controller and a plurality of first disk drives, and a second virtualization device having a second virtual volume related to a second logical volume of a second storage system, said second storage system having a second storage controller and a plurality of second disk drives, the method comprising the steps of:
relating said first logical volume related to at least one of said first disk drives;
relating said second logical volume related to at least one of said second disk drives; and
copying data between the first and second virtual volumes via copying if data between the first and second virtualization devices, wherein said copying of data includes selectively controlling via the first and second virtualization devices a plurality of data copy processes between the first virtual volume and the second virtual volume, the data copy processes including a first copy process copying data between the first and second storage systems without being via the first and second virtualization devices, and a second copy process copying data between the first and second storage systems via the first and second virtualization devices.

22. A virtualization method according to claim 21, wherein said step of copying data between the first and second virtual volumes includes using data being copied between the first and second storage systems.

23. A virtualization method according to claim 21, wherein said selective controlling of the plurality of data copy processes is determined based on whether the first storage system has a function of data copy or not.

24. A virtualization system, comprising:
a first virtualization device having a first virtual volume related to a first logical volume of a first storage system, said first storage system having a first storage controller, a plurality of first disk drives and said first logical volume related to at least one of said first disk drives; and
a second virtualization device having a second virtual volume related to a second logical volume of a second storage system, said second storage system having a second storage controller, a plurality of second disk drives and said second logical volume related to at least one of said second disk drives, wherein
the first and second virtualization devices are configured to copy data between the first and second virtual volumes, the first and second virtualization devices being configured to selectively control a plurality of data copy processes between the first virtual volume and the second virtual volume, the data copy processes including a first copy process copying data between the first and second storage systems bypassing the first and second virtualization devices, and a second copy process copying data between the first and second storage systems via the first and second virtualization devices.

25. A virtualization system according to claim 24, wherein the first and second virtualization devices being configured to selectively control the plurality of data copy processes being determined based on whether the first storage system has a function of data copy or not.

26. A virtualization system according to claim 24, wherein the first virtualization device is configured to receive data of the first logical volume related to the first virtual volume and to send the received data to the second virtualization device, and
the second virtualization device is configured to receive the data sent from said first virtualization device and to send the received data to the second logical volume related to the second virtual volume so that the first and second virtualization devices effect copying of data between the first and second virtual volumes.

27. A virtualization system according to claim 24, wherein the first and second virtualization devices are configured to send one or more commands to the first and/or second storage systems, and
the first and second storage systems are configured to copy data between the first and second logical volumes based on the one or more commands.

28. A virtualization system according to claim 24, wherein the first and second virtualization devices are configured to send a command to the first storage system, and
the first storage system is configured to copy data from the first logical volume to the second logical volume based on the command.

29. A virtualization system according to claim 24, wherein the first and second virtualization devices are configured to store information whether the first and/or second storage system has a data copy function or not, such that if the first and/or second storage system has the data copy function, the first and second virtualization devices are configured to effect copying of data between the first and second storage systems.

30. A virtualization system according to claim 24, wherein the first virtualization device is configured to store information whether the first storage system has a data copy function or not, such that if the first storage system has the data copy function, the first virtualization device is configured to effect copying of data from the first storage system to the second storage system.

31. A virtualization system according to claim 24, wherein the first and second virtualization devices are configured to check information whether the first and/or second storage systems have a data copy function or not, such that if the first and/or second storage system has the data copy function, the first and second virtualization devices are configured to effect copying of data between the first and second storage systems.

32. A virtualization system according to claim 24, wherein the first virtualization device is configured to check information whether the first storage system has a data copy function or not, such that if the first storage system has the data copy function, the first virtualization device is configured to effect copying of data from the first storage system to the second storage system.

33. A virtualization method, comprising the steps of:
providing a first virtualization device having a first virtual volume related to a first logical volume of a first storage system, said first storage system having a first storage controller, a plurality of first disk drives and said first logical volume related to at least one of said first disk drives;
providing a second virtualization device having a second virtual volume related to a second logical volume of a second storage system, said second storage system having a second storage controller, a plurality of second disk drives and said second logical volume related to at least one of said second disk drives; and copying data between the first and second virtualization devices so as to effect copying of data between the first and second virtual volumes, wherein said copying of data includes selectively controlling via the first and second virtualization devices a plurality of data copy processes between the first virtual volume and the second virtual volume, the data copy processes including a first copy process copying data between the first and second storage systems bypassing the first and second virtualization devices, and a second copy process copying data between the first and second storage systems via the first and second virtualization devices.

34. A virtualization method according to claim 33, wherein said selective controlling of the plurality of data copy processes is determined based on whether the first storage system has a function of data copy or not.

35. A virtualization method according to claim 33, further comprising the steps of:
receiving at the first virtualization device data of the first logical volume related to the first virtual volume;
sending the received data to the second virtualization device,
receiving at the second virtualization device the data sent from said first virtualization device; and
sending the received data to the second logical volume related to the second virtual volume so that the first and second virtualization devices effect copying of data between the first and second virtual volumes.

36. A virtualization method according to claim 33, further comprising the steps of:
sending from the first and/or second virtualization devices one or more commands to the first and/or second storage systems; and
copying data between the first and second logical volumes based on the one or more commands.

37. A virtualization method according to claim 33, further comprising the steps of:
sending from the first and/or second virtualization devices a command to the first storage system, and
copying data from the first logical volume to the second logical volume based on the command.

38. A virtualization method according to claim 33, further comprising the steps of:
storing in the first and second virtualization devices information whether the first and/or second storage systems has a data copy function or not; and
if the first and/or second storage system has the data copy function, copying data between the first and second storage systems.

39. A virtualization method according to claim 33, further comprising the steps of:
storing in the first virtualization device information whether the first storage system has a data copy function or not; and
if the first storage system has the data copy function, copying data from the first storage system to the second storage system.

40. A virtualization method according to claim 33, further comprising the steps of:
checking via the first and second virtualization devices information whether the first and/or second storage systems have a data copy function or not; and
if the first and/or second storage system has the data copy function, copying of data between the first and second storage systems.

41. A virtualization method according to claim 33, further comprising the steps of:
checking via the first virtualization device information whether the first storage system has a data copy function or not; and
if the first storage system has the data copy function, copying data from the first storage system to the second storage system.

42. A virtualization method for a system comprising a first virtualization device having a first virtual volume related to a first logical volume of a first storage system, said first storage system having a first storage controller and a plurality of first disk drives, and a second virtualization device having a second virtual volume related to a second logical volume of a second storage system, said second storage system having a second storage controller and a plurality of second disk drives, the method comprising the steps of:
relating said first logical volume related to at least one of said first disk drives;
relating said second logical volume related to at least one of said second disk drives; and
copying data between the first and second virtual volumes via copying if data between the first and second virtualization devices, wherein said copying of data includes selectively controlling via the first and second virtualization devices a plurality of data copy processes between the first virtual volume and the second virtual volume, the data copy processes including a first copy process copying data between the first and second storage systems bypassing the first and second virtualization devices, and a second copy process copying data between the first and second storage systems via the first and second virtualization devices.

43. A virtualization method according to claim 42, wherein said selective controlling of the plurality of data copy processes is determined based on whether the first storage system has a function of data copy or not.

* * * * *